US008462961B1

(12) United States Patent
Bywaters et al.

(10) Patent No.: US 8,462,961 B1
(45) Date of Patent: Jun. 11, 2013

(54) METHOD AND SYSTEM FOR BROADCASTING AUDIO TRANSMISSIONS OVER A NETWORK

(75) Inventors: Kenneth W. Bywaters, Grass Valley, CA (US); James Elliott, Madison, WI (US); Mark Whipple, Madison, WI (US)

(73) Assignee: Singlewire Software, LLC, Madison, WI (US)

( * ) Notice: Subject to any disclaimer, the term of this patent is extended or adjusted under 35 U.S.C. 154(b) by 1962 days.

(21) Appl. No.: 11/140,139

(22) Filed: May 27, 2005

Related U.S. Application Data

(60) Provisional application No. 60/574,980, filed on May 27, 2004.

(51) Int. Cl.
*H04B 3/00* (2006.01)
*G06F 15/16* (2006.01)

(52) U.S. Cl.
USPC .............. 381/77; 709/227; 709/203; 709/206

(58) Field of Classification Search
USPC .............. 379/170, 179, 88.18; 709/223–226, 709/206, 227; 715/158; 370/503; 340/7.2, 340/601; 704/270; 381/77
See application file for complete search history.

(56) References Cited

U.S. PATENT DOCUMENTS

| 6,297,726 | B1 * | 10/2001 | Yamazaki ...................... 340/7.2 |
| 6,351,218 | B1 * | 2/2002 | Smith ........................... 340/601 |
| 6,542,868 | B1 * | 4/2003 | Badt et al. ..................... 704/270 |
| 7,225,331 | B1 * | 5/2007 | McBrearty et al. ........... 713/158 |
| 2002/0184358 | A1 * | 12/2002 | Traversat et al. ............. 709/223 |
| 2004/0162880 | A1 * | 8/2004 | Arnone et al. ................ 709/206 |
| 2005/0031095 | A1 * | 2/2005 | Pietrowicz ................. 379/88.18 |
| 2005/0135429 | A1 * | 6/2005 | Bingham et al. .............. 370/503 |
| 2005/0201541 | A1 * | 9/2005 | Berezowski et al. ......... 379/170 |

OTHER PUBLICATIONS

Polk Audio webpage "http://www.polkaudio.com/homeaudio/products/hidden/ip/lc265i-ip," Oct. 26, 2005, pp. 1-3.

* cited by examiner

*Primary Examiner* — Duc Nguyen
*Assistant Examiner* — Sonia Gay
(74) *Attorney, Agent, or Firm* — Michael Best & Friedrich LLP

(57) ABSTRACT

Methods for communicating with a speaker connected to a network. The method can include generating a service request that includes speaker identification, a first password, and an action indicator that specifies a requested service; sending the service request to the speaker from the device; verifying the first password included in the service request; and performing the requested service if the first password is verified.

22 Claims, 15 Drawing Sheets

METHOD AND SYSTEM FOR BROADCASTING AUDIO TRANSMISSIONS OVER A NETWORK

RELATED APPLICATIONS

This application claims priority to provisional application No. 60/574,980 filed on May 27, 2004.

FIELD OF THE INVENTION

Embodiments of the invention generally relate to transmitting audio over a network. More specifically, embodiments of the invention provide a method of broadcasting audio transmitted over a network with a speaker connected to the network.

BACKGROUND OF THE INVENTION

Telephone systems, or more generally audio or voice transmission systems, utilizing IP networks are often referred to voice-over Internet protocol ("VoIP") systems. Using a data network for a VoIP system can increase the efficiency of data transmission. For example, a device connected to the network that is configured to obtain and transmit audio packets over an internet protocol ("IP") network, can also be configured to obtain and transmit data packets since both types of packets are transmitted on the same network. Telephone units connected to the network, for example, can act similar to a personal computer using a browser application and can request data from servers and other devices attached to the network in addition to allow a user to "call" another telephone unit. In some embodiments, networked telephone units can be used to access up-to-date directories and obtain files during a telephone conversation.

In some embodiments, the VoIP system can be configured to broadcast an audio message and/or a text message to one or numerous devices connected to the VoIP system. If a VoIP system includes a speaker, the VoIP network can also be used as a paging system, which can eliminate the need for a separate paging system. In the case of an emergency or an important announcement, an audio message or a text message can be sent to one or more devices connected to the VoIP system. An audio and corresponding text message can also be sent together in order to alert hearing impaired individuals of an emergency or an announcement. Also, since an IP network can span multiple locations of an organization or business, the VoIP system can also span multiple locations. This provides businesses and organizations that have multiple discrete locations to page and/or broadcast messages to all their employees or members at one time regardless of their location. The paging capability, however, can be difficult to manage and difficult to ensure that the paging system is being used as intended and by authorized personnel.

SUMMARY OF THE INVENTION

Some embodiments of the invention provide a computer readable medium including instructions for communicating with a speaker attached to a network. The computer readable medium can include instructions for generating a first registration request that includes device identification and speaker identification and sending the first registration request to a device from the speaker. The computer readable medium can also include instructions for generating a first registration response that includes a first password and sending the first registration response to the speaker from the device. In addition, the computer readable medium can include instructions for generating a service request that includes speaker identification, a second password, and a request identifier that specifies a requested service; sending the service request to the speaker from the device; verifying the second password included in the service request based on the first password; and performing the requested service if the second password is verified.

Additional embodiments provide a method of registering a device with a speaker connected to a network. The method can include generating a first registration request that includes device identification and speaker identification; sending the first registration request to the device from the speaker; marking the speaker as active; generating a first registration response that includes a first password; and sending the first registration response to the speaker from the device.

Another embodiment provides a method of communicating with a speaker connected to a network. The method can include generating a service request that includes speaker identification, a first password, and an action indicator that specifies a requested service; sending the service request to the speaker from the device; verifying the first password included in the service request; and performing the requested service if the first password is verified.

Additional objects and features of the invention are illustrated in the drawings and provided in the subsequent description.

DETAILED DESCRIPTION

Figure 1:
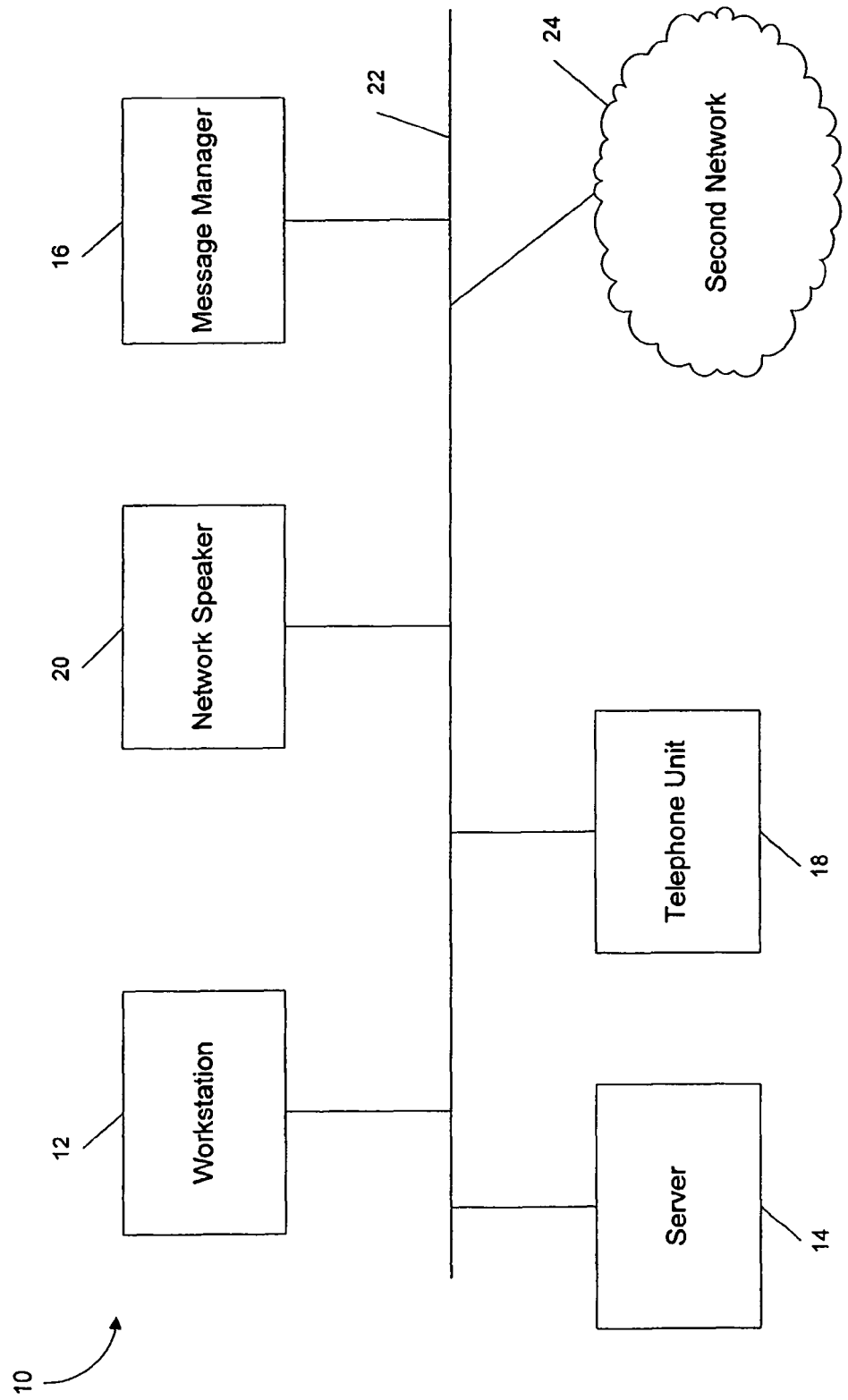
FIG. 1 illustrates an exemplary network configured to transmit data.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

In addition, it should be understood that embodiments of the invention include both hardware, software, and electronic components or modules that, for purposes of discussion, can be illustrated and described as if the majority of the components were implemented solely in hardware. However, one of ordinary skill in the art, and based on a reading of this detailed description, would recognize that, in at least one embodiment, the electronic based aspects of the invention can be implemented in software. As such, it should be noted that a plurality of hardware and software based devices, as well as a plurality of different structural components can be utilized to implement the invention. Furthermore, and as described in subsequent paragraphs, the specific configurations illustrated in the drawings are intended to exemplify embodiments of the invention and that other alternative configurations are possible.

FIG. 1 illustrates an exemplary network 10 configured to transmit data, including audio data. The network 10 includes a workstation 12, a server 14, a message manager 16, a telephone unit 18, and a network speaker 20. The network 10 can also include multiple workstations, server, message manager, telephone units, and/or network speakers. In some embodiments, the workstation 12, the server 14, and the message manager 16 are optional devices of the network 10. The network 10 can also include additional devices, such as printers, databases, routers, bridges, etc.

The network 10 can include one or more networks or communication systems such as the Internet, a local area network ("LAN"), a wide area network ("WAN"), a telephone system, a wired network, a wireless network, a satellite network, a cable TV network, and various other private and public networks. It should be understood that the invention is not limited to any specific network or combinations of networks. In some embodiments, the network 10 includes a LAN utilizing an Ethernet architecture. Other architectures are also possible, such as token ring and fibre channel architectures. The devices of the network 10 can be connected by a connection 22. The connection 22 can include wired or guided transmission paths using twisted pair, coaxial cable, optical fiber, and/or the like. The connection 22 can also include wireless or unguided transmission paths using microwave or infrared technologies. The choice of networks, architecture, and/or data transmission paths can depend on the structure and intended use of the network 10.

The network 10 can also be connected to second network 24. The second network 24 can include the Internet, another LAN, a WAN, or the like.

In some embodiments, the telephone unit 18 includes an input device, such as a microphone, that can capture audio data and an output device, such as a speaker that can play or broadcast audio data. One telephone unit 18 can transmit captured audio data over the network 10 to another telephone unit 18 or another device connected to the network 10, such as the network speaker 20, the workstation 12, the server 14, and/or the message manager 16. In some embodiments, the telephone unit 18 can include other input devices, such as a keypad, one or more selectors, and/or a touch screen, that a user can use to select a destination for audio data, enter and/or select a text message and/or acknowledge and reply to obtained data. The telephone unit 18 can also include a display that can render obtained data and/or provide an interface for selecting a destination for captured data or monitoring captured audio data. Suitable commercially available telephone units can include those available from Cisco Systems, Inc. (www.cisco.com), Avaya, Inc. (www.avaya.com) and Nortel Networks Limited (www.nortel.com).

The workstation 12 and the server 14 can store data that can be retrieved by devices connected to the network 10, such as the telephone unit 18. In some embodiments, the workstation 12 and the server 14 can also transmit data over the network 10 without receiving a request or query from a device connected to the network 10. In addition, the workstation 12 can execute a client application. The client application can communicate with the server 14 in order to provide a user interface to the network speaker 20 that allows a user to configure, operate, and monitor the operation of the network speaker 20.

The message manager 16 can provide managing and routing services to one or more devices connected to the network 10, such as one or more telephone units 18. In some embodiments, messages transmitted from a device connected to the network 10 are initially routed to the message manager 16. The message manager 16 then routes each message to a destination. A message destination can include a telephone unit, a workstation, another message manager, another network, such as the Internet, and other devices and networks connected to the network 10. In some embodiments, the message manager 16 can also route a message to multiple destinations in order to broadcast a message to multiple devices. Suitable commercial available message managers can include InformaCast available from Berbee Information Networks Corporation (www.berbee.com), ZonePage available from Norstan, Inc. (www.norstan.com), and RapidBroadcast available from Corvero Networks (www.corvero.com). Alternatively, in some embodiments, the devices connected to the network 10 directly route messages to one or more other devices connected to the network 10 or other networks without the aid of the message manager 16.

Figure 2:
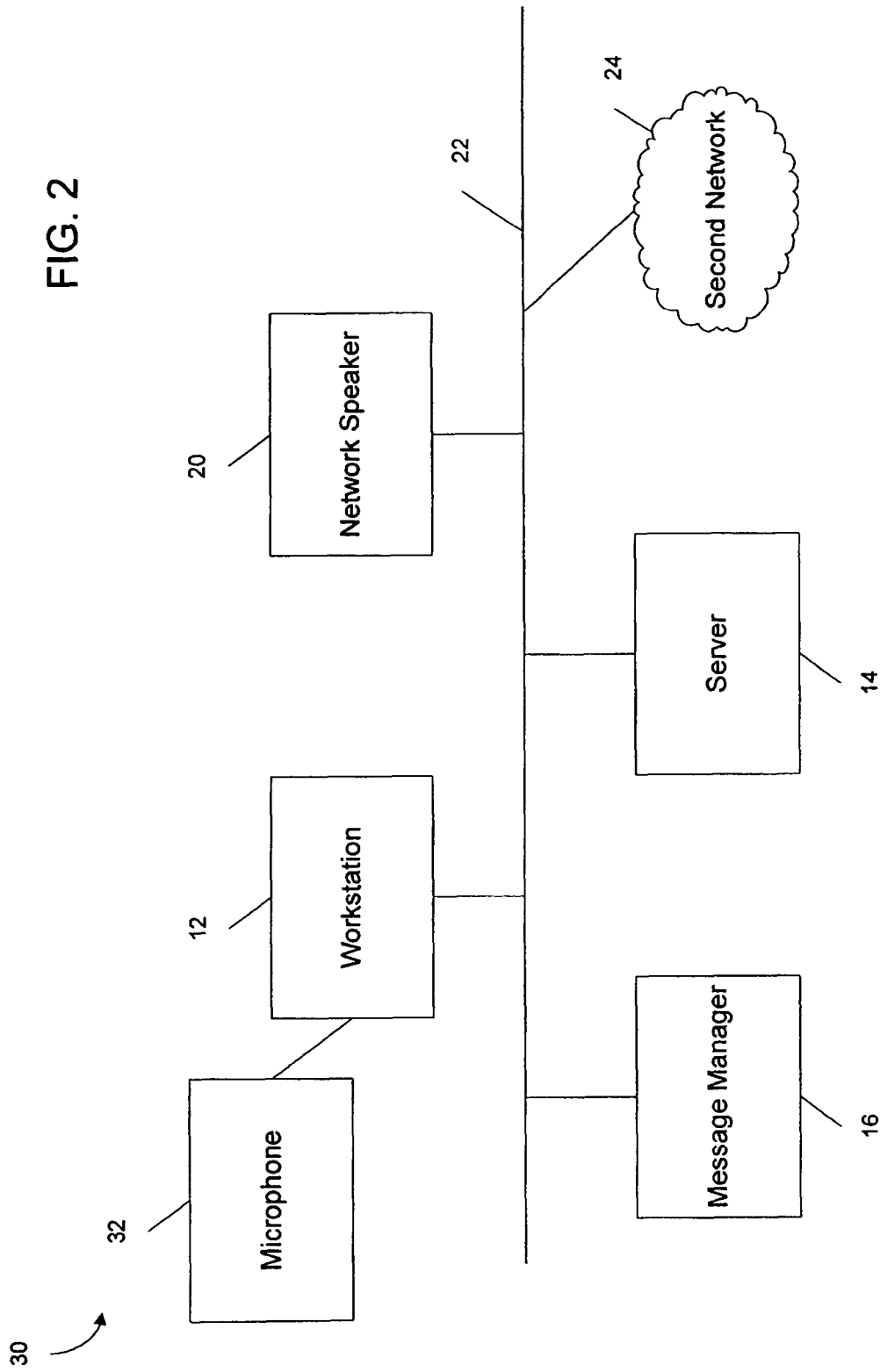
FIG. 2 illustrates another exemplary network configured to transmit data.

FIG. 2 illustrates another exemplary network 30. The network 30 includes the workstation 12, an audio-capturing device 32, the server 14, the message manager 16, and the network speaker 20. In some embodiments, the audio-capturing device 32 can include a microphone and can be connected to the workstation 12 (or can be an internal component of the workstation 12) in order to allow a user of the workstation 12 to obtain audio messages to be transmitted over the network 30.

As described above with respect to the telephone unit 18, the workstation 12 and/or audio-capturing device 32 can include an input device, such as a keypad, one or more selector, a touch screen, etc., that can allow a user to enter or select a destination for audio data captured with the audio-capturing device 32 and/or data stored in the workstation 12 (e.g., text messages). A user can also use the input device to enter or select a text message to be transmitted over the network 10 and/or to respond to and acknowledge data obtained by the workstation 12 and/or the audio-capturing device 32. In some embodiments, the workstation 12 and/or audio-capturing device 32 can include a display that can render messages and/or instructions for using the workstation 12 and/or the audio-capturing device 32 in order to capture, transmit, and/or receive data.

In some embodiments, the audio-capturing device 32 can also be directly connected to the network 30 rather than indirectly through the workstation 12.

Figure 3:
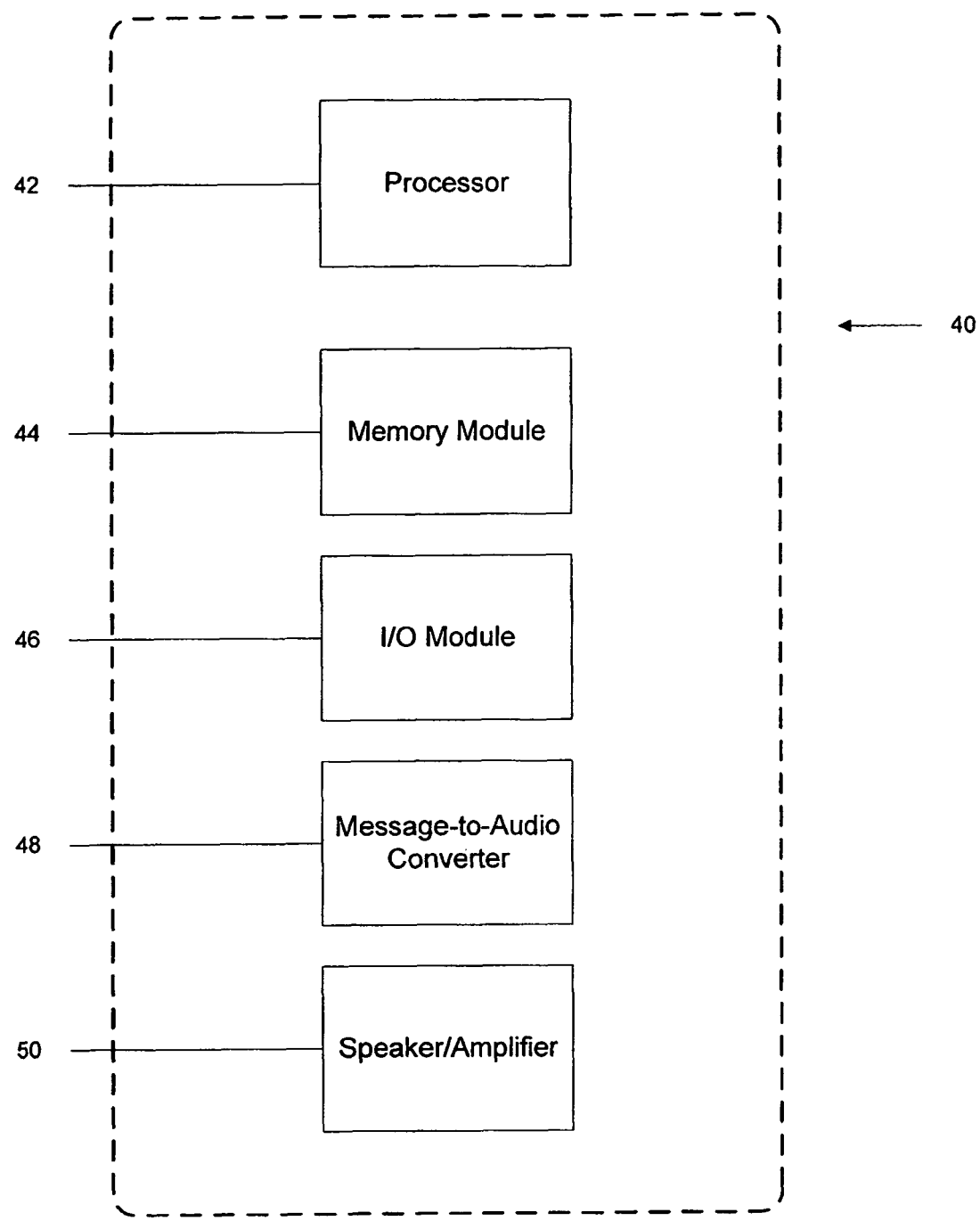
FIG. 3 is a schematic diagram illustrating the hardware inside the speaker illustrated in FIGS. 1 and 2.

FIG. 3 illustrates exemplary hardware 40 that can be included in the network speaker 20. In the configuration shown, the hardware 40 includes a processor 42, a memory module 44, an I/O module 46, a message-to-audio converter 48, and a speaker/amplifier 50. The I/O module 46 can include an interface application for communicating with other devices connected to the network speaker 20 and/or a user. The memory module 44 can include non-volatile memory such as one or more forms of ROM, or one or more disk drives, RAM, other memory, or a combination of the foregoing. The message-to-audio converter 48 can include a translation application configured to convert text-based messages obtained by the network speaker 20 into physical sound waves or data that can be used to generate sound waves by the speaker/amplifier 50. The speaker/amplifier 50 can include well known speaker components, such as a diaphragm, a magnet, a voice coil, and the like. In some embodiments, the speaker/amplifier 50 obtains signals generated by the message-to-audio converter 48 and mechanically operates the components of the speaker/amplifier 50 in order to create sound waves corresponding to the obtained signals. Message-to-audio converters 48 and speaker/amplifiers 50 are standard well known applications used in many sound systems and, therefore, the details and functionality of each are not described herein.

The processor 42 is used to execute programs and/or applications stored in the memory module 44, the I/O module 46, and/or the message-to-audio converter 48, such as the interface program and the translation application described above. In some embodiments, the components of the hardware 40 of the network speaker 20 can communicate over a data bus (not shown), through a discrete direct connection, and/or by a combination thereof. It should be understood that the network speaker 20 can include other hardware components and/or can incorporate one or more of the components shown in FIG. 3 into a single component. For example, the network speaker 20 can include a microphone or another audio-capturing device that can be used to capture an audio stream. The network speaker 20 can also include a display for rendering text messages. In addition, the network speaker 20 can include one or more selectors, such as mechanical buttons, switches, levers, etc., and/or virtual buttons, switches, levers, etc. on a touch screen. In some embodiments, a user can use the selectors to signal a desire to respond to a broadcast message. The selectors can also be used to configure and/or operate the network speaker 20. As described above, in some embodiments, the workstation 12 can execute a client application that provides an interface to the network speaker 20. The client application can provide a display (e.g., a monitor) and/or one or more selectors (e.g., a keyboard, a touch screen, a cursor control device, etc.) that can be used display text messages and control the operation of the network speaker 20. In addition, the client application can provide logging and status functionality for the network speaker 20.

Figure 4:
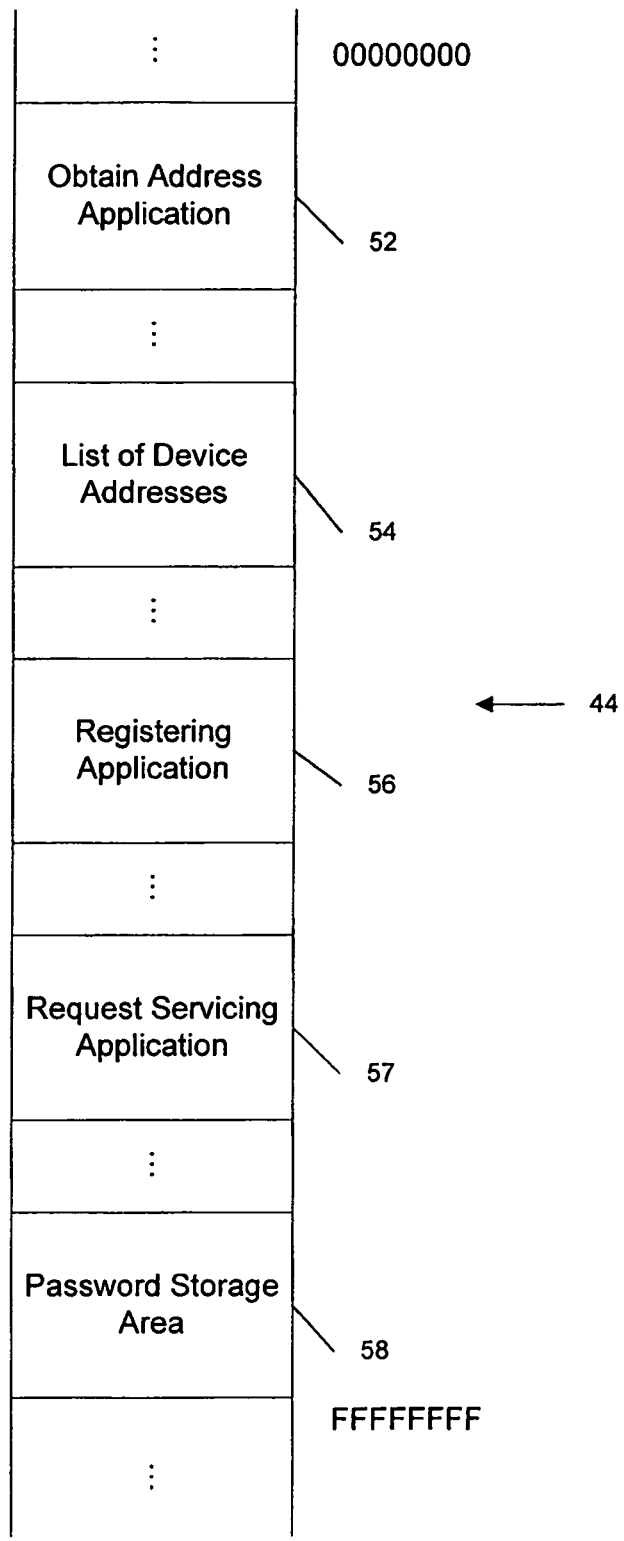
FIG. 4 is a schematic diagram illustrating the software that can be stored in the memory module illustrated in FIG. 3.

FIG. 4 illustrates exemplary contents of the memory module 44 or a portion thereof. As illustrated in FIG. 4, the memory module 44 is illustrated as having four portions each storing a set of computer instructions or data, such as an obtain-address application 52, a list of device addresses 54, a registering application 56, a request servicing application 57, and a password storage area 58. In various implementations, the memory module 44 can be configured in such a way that it does not contain four distinct portions. It should be understood that functional features of the memory module 44 can be combined in a variety of ways and additional features and portions can be included. For example, a separate database (not shown) could replace the memory module 44.

Figure 5:
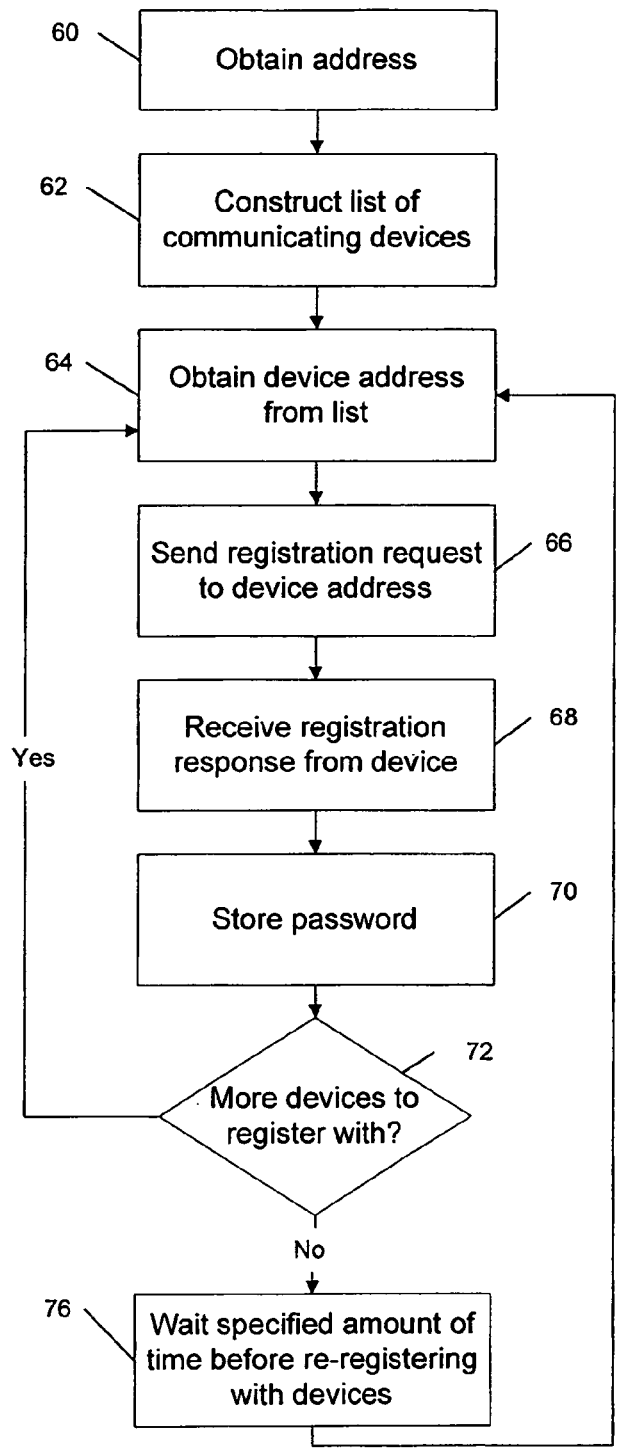
FIG. 5 is a flow chart displaying a process of registering the speaker illustrated in FIGS. 1 and 2 with devices connected to a network.

FIG. 5 is a flow chart portraying the protocol used to register the network speaker 20 with devices, such as the telephone unit 18 and/or the workstation 12. As shown in FIG. 5, when the network speaker 20 is powered up and obtains network connectivity, the network speaker 20 obtains an Internet protocol ("IP") address (block 60). In some embodiments, the network speaker 20 uses a dynamic host configuration protocol ("DHCP") to obtain an address. The DHCP can be included in the obtain-address application 52 stored in the memory module 44 of the network speaker 20. DHCP is a protocol for dynamically assigning addresses to devices connected to a network. With dynamic addressing, a device, such as the network speaker 20, can have a different IP address every time it connects to a network. In some embodiments, the address of a device can also change while the device is connected to a network. Dynamic addressing can simplify network administration since the protocol application keeps track of addresses rather than requiring an administrator to manage the task. DHCP allows a device to be added to a network without the hassle of manually determining and manually assigning the device a unique address, which can be a daunting task when multiple devices are connected to a network. Alternatively, the network speaker 20 can be preprogrammed with an address or can use other protocols for obtaining an address.

If the network speaker 20 is unable to obtain an address via DHCP after a predetermined period, the address of the network speaker 20 can default to a predetermined default address. The default address can include a non-routable address in order to prevent use of the network speaker 20 until a valid address is obtained. In some embodiments, a user can manually configure another device, such as the workstation 12, to directly communicate with the network speaker 20 at the default address in order to view status information and/or provide maintenance operations so that the network speaker 20 can successfully obtain an address.

In some embodiments, the network speaker 20 also obtains one or more IP addresses for other devices connected to the network 10 or 30, such as the message manager 16. The network speaker 20 can obtain the additional device addresses using DHCP. In some embodiments, DHCP responses obtained by the network speaker 20 can include one or more options (e.g., Option 150) that include an array of IP addresses. The array of IP addresses can include one or more addresses for one or more message managers 16.

After the network speaker 20 has obtained an address, the network speaker 20 can construct a list of addresses of devices that are configured to communicate with the network speaker 20 (block 62). In some embodiments, the network speaker 20 can include a preprogrammed list of device addresses in the memory module 44 included in the list of device addresses 54 (see FIG. 4). The network speaker 20 can also construct the list by locating and accessing a configuration file stored on a separate device, such as the workstation 12, the server 14, and/or the message manager 16. Using a configuration file, the network speaker 20 can construct a list of device addresses. In some embodiments, the network speaker 20 can use trivial file transfer protocol ("TFTP") to find the configuration file.

In some embodiments, the network speaker 20 attempts to locate a configuration file on a device, such as the message manager 16, that is identified by one of the IP addresses the network speaker 20 obtained in the array of IP addresses included in a DHCP response. The network speaker 20 can be preprogrammed to search for a configuration file with a predetermined file name on a device identified by an address included in the array of IP addresses. For example, the network speaker 20 can search for a file with a file name based on a hardware address of the network speaker 20, such as "IPSpeaker0123456789ab.cfg," where "0123456789ab" represents a hardware address of the network speaker 20. If the network speaker 20 cannot locate a file with a file name based on its hardware address, the network speaker 20 can attempt to locate a generic network speaker file. In some embodiments, the generic network speaker file can have a file name of "IPSpeaker.cfg." Furthermore, if the network speaker 20 is able to locate the generic network speaker file, the network speaker 20 can attempt to locate a configuration file on a different device whose address was included in the array of IP addresses the network speaker 20 obtained in a DHCP response. Finally, if the network speaker 20 has tried each device identified in the array of IP addresses without locating a configuration file, the network speaker 20 can wait a predetermined amount of time (e.g., five minutes) and can attempt to obtain a new IP address and/or a new array of IP address using DHCP, as described above.

Once the network speaker 20 locates a configuration file, the network speaker 20 can parse and process the data included in the configuration file. In some embodiments, the configuration file can include an extensible mark-up language ("XML") formatted document with the following exemplary structure:

<SpeakerConfiguration>
<Devices registration-interval="5" capture-keepalive-second=2">
   <Device1 url="http://123.45.67.89:8081/Device1/admin?cmd=spkr"/>
</Devices>
</SpeakerConfiguration>

It should be understood the above XML-formatted document example, as well as the XML-formatted document examples to follow, can include additional XML headers, that are omitted here in order to simplify the message structure examples.

As shown above, the XML-formatted document can include one or more "Devices" tags. In some embodiments, the XML-formatted document can include a "Devices" tag for each device that is configured to communicate with the network speaker 20. Each "Devices" tag can include a "url" attribute. The "url" attribute specifies a hypertext transport protocol ("HTTP") uniform resource location ("URL"), or address, which represents an address of the device identified by a "Devices" tag. The network speaker 20 can construct the list of device addresses 54 with the "url" attribute included in each "Devices" tag. In some embodiments, the network speaker 20 can re-access the configuration file at predetermined time intervals in order to keep a list of device addresses to register with updated.

A "Devices" tag can also include a "registration-interval" attribute. The "registration-interval" attribute specifies a re-registration frequency for how often the network speaker 20 should register with the device identified by the "Devices" tag. The re-registration frequency can be specified in minutes, seconds, hours, execution cycles of the processor 42, etc. In some embodiments, the "Devices" tag can include a "registration-interval-seconds" attribute in addition to or in place of the "registration-interval" attribute that specifies a re-registration frequency in smaller units, such as seconds. The "registration-interval-second" attribute can be used to provide increased control over the registration time intervals. If a "Devices" tag does not include a "registration-interval" attribute or a "registration-interval-seconds" attribute, the network speaker 20 can use a default frequency, such as five minutes.

A "Devices" tag can also optionally include a "capture-keepalive-seconds" attribute. The "capture-keepalive-seconds" attribute can specify a notification frequency for how often the network speaker 20 should notify a device of requested services which the network speaker 20 is continuing to perform (e.g., broadcasting a message, capturing audio, etc.), as described below. If a "Devices" tag does not include a "capture-keepalive-seconds" attribute, the network speaker 20 can use a default frequency, such as two seconds. In some embodiments, the "capture-keepalive-seconds" attribute can also specify a frequency in units other than seconds.

In some embodiments, a configuration file accessed by the network speaker 20 also includes software/firmware information. The software/firmware information can include files, file names, file version number, and the like, that indicate current software and/or firmware that the network speaker 20 should be operating with. The network speaker 20 can compare the software/firmware information included in a configuration file with current software/firmware information known by the network speaker 20 in order to determine whether its software and/or firmware needs to be updated. For example, if the current software/firmware information of the network speaker 20 differs from the software/firmware information specified in a configuration file, the network speaker 20 can update its software and/or firmware as specified in the configuration file. In some embodiments, a configuration file can specify a location from where the network speaker 20 should access the updated software and/or firmware. A configuration file can also include the updated software and/or firmware files. In some embodiments, the network speaker 20 obtains updated software and/or firmware from a TFTP server connected to the network speaker 20. When obtaining updated software and/or firmware, the network speaker 20 can use a file validation technique, such as signature validation and/or checksum validation, in order to reduce the chance of obtaining and loading a corrupt updated file that can cause damage to the network speaker 20. In some embodiments, after obtaining updated software and/or firmware, the network speaker 20 can be configured to automatically reboot in order to begin operating with the updated software and/or firmware.

In some embodiments, the software and/or firmware information can include an XML formatted document with the following exemplary structure:

<Software/Firmware file="ipspeaker_a7.bin"/>
<SpeakerData file="datafile001.bin"/>
<StreamParameters ttl="16" trafficClass="40"/>
<Logger ip="123.45.67.89" port="300"/>

As shown above, the software/firmware information includes a "Software/Firmware file" attribute that specifies a file name of the updated software and/or firmware that the network speaker 20 should obtain and load if the network speaker 20 is not currently using the most up-to-date software and/or firmware. The software/firmware information can also optionally include a "SpeakerData file" attribute that specifies a data file to be loaded by the network speaker 20. In some embodiments, the data file can store messages and/or tones that the network speaker 20 can broadcast. For example, the data file can include predefined bell sounds for a bell scheduler. Storing the message and/or tones on the network speaker 20 can reduce network traffic since a device requesting a broadcast does not have to send the message and/or tone to broadcast to the network speaker 20.

If the network speaker 20 includes a microphone or another audio-capturing device, the software/firmware information can optionally include transmission settings, such as a "StreamParameters ttl" attribute and/or a "trafficClass" attribute. The "StreamParameters ttl" attribute can specify an IP time-to-live value with which audio stream packets should be sent. The "trafficClass" attribute can specify an IP traffic class that the audio stream packets should be assigned. In some embodiments, the "trafficClass" attribute can be used for quality of service routing purposes. If either the "StreamParameters ttl" attribute or the "trafficClass" attribute are missing, the network speaker 20 can use a default value a missing attribute.

In some embodiments, the software/firmware information can also optionally include logging settings that can be used to configure the network speaker 20 to logs its operation. As shown above, the logging settings can include a "Logger ip" attribute and a "port" attribute. The "Logger ip" attribute and the "port" attribute can be used to configure the network speaker 20 to send logging data to a specified address and port. In some embodiments, the network speaker 20 can send logging data as user datagram protocol ("UDP") packets to the address and port specified with the "Logger ip" attribute and the "port" attribute.

In addition, the software/firmware information can optionally include two additional logging settings: "rootLevel" and "configFile." The "rootLevel" attribute can set a logging sensitivity value. In some embodiments, the "rootLevel" attribute can be set to values such as "debug," "info," "warn," "error," and "fatal," and the default value for logging data can be "info." The "configFile" attribute can specify a name of a logging configuration file which the network speaker 20 and/or a client application of the network speaker 20 can attempt to download from a server, such as a TFTP server connected to the network speaker 20. The logging configuration file can include an XML-formatted document that provides logging configuration data.

Once the network speaker 20 has obtained and/or constructed the list of device addresses 54, the network speaker 20 can obtain one of the addresses from the list 54 (block 64) and can attempt to register with the device at the address. In some embodiments, the list of device addresses 54 can include the address of the workstation 12, the server 14, the message manager 16, the telephone unit 18, and/or other devices connected to the networks 10 and 30. The network speaker 20 can execute the registering application 56 to register with each device identified in the list of device addresses 54.

In some embodiments, if the network speaker 20 is connected to a network that includes the message manager 16, the network speaker 20 can register with the message manager 16 and allow the message manager 16 to register with the devices that it manages. The network speaker 20 can also directly register with each device whose address is included in the list of device addresses 54.

To register with a device network speaker 20 sends a registration message to the address of the device (block 66) and waits for a registration response from the device.

In some embodiments, the registration message includes an HTTP GET request with the following exemplary structure:
http://123.34.67.89:8081/Device1/
admin?cmd=spkr&address=0123456789ab&port=8088

A first portion of the registration request (i.e., (http://123.45.67.89:8081/Device1/admin?cmd=spkr) can include device identification, such as the address (i.e., the URL) of the device that the network speaker 20 is attempting to register with. The first portion of the registration request can also include other forms of device identification, such as a unique device name.

A second portion of the request (i.e., address=0123456789ab&port=8088) can include speaker identification, such as a hardware address of the network speaker 20. As shown above, in some embodiments, the hardware address of the network speaker 20 can also include a port that a device should contact to communicate with the network speaker 20. Hardware addresses in an IP network are commonly referred to as media access control ("MAC") addresses. MAC addresses provide addressing or routing information at a lower level than IP addresses. Network devices such as routers or bridges often contain an address resolution protocol table to map IP addresses to MAC addresses. In comparison to IP addresses that can change for a specific device, MAC addresses often remain constant with regard to the hardware that the address identifies. MAC addresses are often hard-coded during manufacture of a device.

In some embodiments, the registration request can include a "display" attribute.

The "display" attribute can specify whether or not the network speaker 20 includes a display that can render text messages. For example, the "display" attribute can have a value of "true" if the network speaker 20 includes a display and can have a value of "false" if the network speaker 20 does not include a display. In some embodiments, if the registration request does not include a "display" attribute, a device receiving the registration request can assume that a display is not available. A registration request including a "display" attribute can have the following exemplary structure:
http://123.34.67.89:8081/Device1/
admin?cmd=spkr&address=0123456789ab&port=8088
&display=true A "mic" attribute can also be included in the registration request in order to indicate whether the network speaker 20 includes a microphone or another audio-capturing device. Similar to the "display" attribute the "mic" attribute can have a value of "true" if the network speaker 20 includes an audio-capturing device and can have a value of "false" if the network speaker 20 does not include an audio-capturing device. In some embodiments, if a registration request does not include a "mic" attribute, a device receiving the request can assume that an audio-capturing device is not available. A registration request with a "mic" attribute can have the following exemplary structure:
http://123.34.67.89:8081/Device1/
admin?cmd=spkr&address=0123456789ab&port=8088
&mic=true Furthermore, the registration request can optionally include a "ui" attribute. The "ui" attribute can specify whether the network speaker 20 includes a user interface. In some embodiments, the network speaker 20 can include a simple user interface that has one or more selectors, as described above. In some embodiments, the "ui" attribute can have a value of "buttons" or "rich." A network speaker 20 with a single selector can include a "ui" attribute with a value of "buttons" in a registration request, and a network speaker 20 with a multiple selectors and/or a client application executable on a device with multiple selectors (e.g., the workstation 12) can include a "ui" attribute with a value of "rich" (specifying a "rich" user interface with more functionality than a single selector or simple user interface) in a registration request. If a registration request obtained by a device does not include a "ui" attribute, the device can assume that network speaker 20 does not include any selectors. A registration request with a "ui" attribute can include an HTTP GET request with the following exemplary structure:
http://123.34.67.89:8081/Device1/
admin?cmd=spkr&address=0123456789ab&port=8088
&ui=rich Upon receiving the registration request, the device can send a registration response (block 68) back to the network speaker 20. In some embodiments, the registration response can include an XML-formatted document with the following exemplary structure:
<SpeakerRegistration>
<InService address="0123456789ab" password="jasj3u2" time="2004/05/22 08:48:01"/>
</SpeakerRegistration>

As shown above, the registration response can include an "InService address" attribute. The "InService address" attribute can specify speaker identification, such as the hardware address of the network speaker 20, which was included in the registration request sent from the network speaker 20.

The registration response can also include a "password" attribute. In some embodiments, the "password" attribute can include a randomly generated password that the device can use to securely communicate with the network speaker 20. The network speaker 20 can record the password as associated with the device and can use the password to verify that messages obtained from device included in the password provided in the registration response. In some embodiments, each time the network speaker 20 registers with the device, the device generates and sends a new password to the network speaker 20 in a registration response. By sending a new password each time the network speaker 20 registers with the device, previously-sent service requests (e.g., broadcast requests, test requests, audio capture requests, etc.) cannot be resent by eavesdroppers or other un-authorized users or devices.

To further increase security of using the network speaker 20, passwords can be encrypted before being sent to the network speaker 20 in the registration response. For example, a device and the network speaker 20 can share a cryptographic key, and the device can encrypt a password with the key before sending the password to the network speaker 20. The network speaker 20 can use the shared key to decrypt the encrypted password. In some embodiments, the device can also use the shared cryptographic key to encrypt a password with a number. The number can be incremented each time the device provides a password to the network speaker 20 (e.g., in a registration response and/or in a service request). The network speaker 20 can then verify that the number encrypted with the password is larger than any previous number accompanying a password that was obtained by the network speaker 20. If the network speaker 20 obtains a number that is equal to or less than any previous number, the network speaker 20 can identify that a previously-sent message has been resent. The network speaker 20 can ignore or disregard the resent message. The network speaker 20 can also send an error response to the device that sent the unauthorized resent message. It should be understood that other cryptographic mechanisms can also be used to increase the security of using the network speaker 20, such as public key systems, digital signatures, and/or digital certificates.

As shown above, the registration response can also include a "time" attribute. The "time" attribute can include a time value, such as a current time value, on the device sending the registration response. In some embodiments, the network speaker 20 can use the time value to initialize or update an internal timer. In some embodiments, the network speaker 20 can use the internal timer to determine when to re-register with the device. The network speaker 20 can also include a display and can use the internal timer to display or indicate a current time on the display. The time value can also be used for recording timestamps on a status page of the network speaker 20 and/or logging data of the network speaker 20.

Once the network speaker 20 has obtained the registration response, the network speaker 20 parses the data included in the registration response and stores the password (and time, if applicable) (block 70). The network speaker 20 can then determine if it needs to register with another device (block 72). If there is another device whose address is listed in the list of device addresses 54 that the network speaker 20 has not already registered with (or needs to re-register with), the network speaker 20 obtains the address of the device from the list (block 64) and generates and sends a registration request to the device (block 66).

Once the network speaker 20 has registered (or attempted to register) with each listed device (or simultaneously while the network speaker 20 is registering with devices), the network speaker 20 can re-register with a device. In some embodiments, the network speaker 20 waits a predetermined amount of time before re-registering with a particular device (block 76). As described above, each device can have a predetermined amount of time between registration cycles that is specified with the "time" attribute included in the configuration file. For example, if the configuration file includes a "Devices" tag that includes a "time" attribute of two minutes, then the network speaker 20 waits two minutes before it re-registers with the device specified by the "Devices" tag. Each device can have a distinct time attribute, and the network speaker 20 can use its internal timer, or an internal timer for each device, to wait the predetermined amount of time.

After the network speaker 20 has waited the predetermined amount of time for a particular device, the network speaker 20 re-registers with the device by obtaining the device's address (block 64) and generating and sending a subsequent registration request to the device (block 66). In this sense, the network speaker 20 repeatedly reports its existence and availability to each listed device at regular registration cycles while waiting for service requests from registered devices.

If the network speaker 20 is unable to reach a device in order register or re-register with the device, the network speaker 20 can send another registration request. In some embodiments, the network speaker 20 can attempt to register or re-register with a device four times and then can reboot and perform the configuration process (i.e., obtain EP address, construct a list of device addresses, etc.), as described above.

Figure 6:
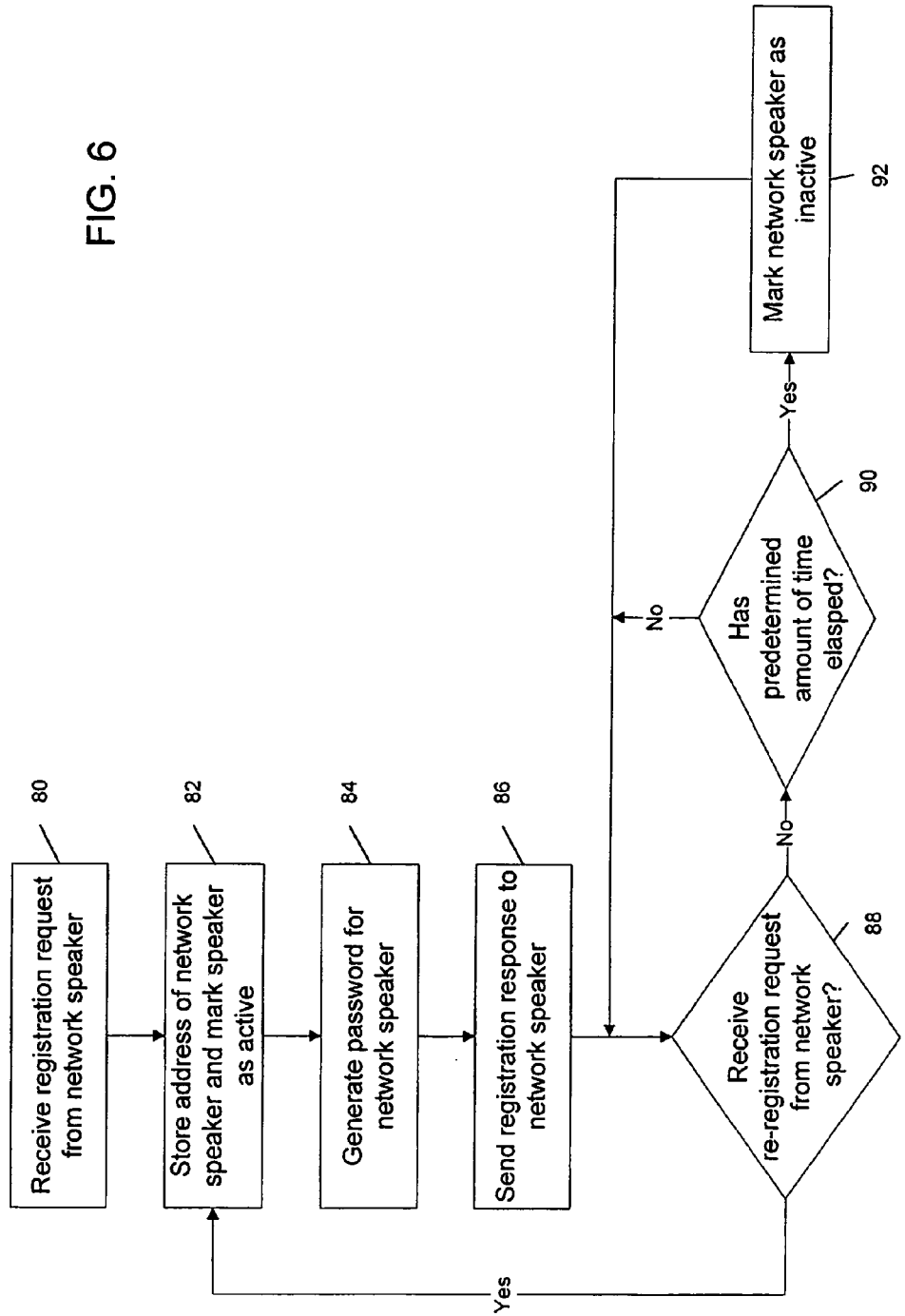
FIG. 6 is a flow chart displaying a process of registering a device with the speaker illustrated in FIGS. 1 and 2.

FIG. 6 is a flow chart displaying a process of registering a device with the network speaker 20. Upon receiving a registration request (block 80) as described above, the device can store the hardware address of the network speaker 20, which is included in the registration request (block 82). The device can also mark or note that the network speaker 20 is active or available to broadcast a message (block 82). In some embodiments, the device can also obtain an IP address of the network speaker 20. Data packets sent over IP networks commonly contain headers specifying both the source and destination IP addresses, and, therefore, if the registration request includes a header, the device can obtain and store the IP address of the network speaker 20.

In some embodiments, the device can also include an interface application that allows the device to detect network speakers with and/or without waiting for a registration request. The interface application can also allow users to assign logical names to detected network speakers and/or associate detected network speakers with groups of recipients in order to organize broadcasts. In addition, the interface application can allow user to manage and/or track services provided by particular network speakers, such as audio-capturing, text message display, etc.

After receiving the registration request, the device generates a password for the network speaker 20 (block 84). The password can be preprogrammed into the device or can be generated randomly by the device as needed. Methods for generating and/or establishing random passwords are well known in the art, and, therefore, are not discussed in detail herein.

The device then constructs a registration response and sends the registration response to the network speaker 20 (block 86). The registration response can include the hardware address of the network speaker 20 that the device obtained in the registration request, a password, and a timestamp.

After the device has generated and sent the registration response to the network speaker 20, the device can send service requests, such as broadcast requests, test requests, audio capture request, etc., to the network speaker and/or wait for the network speaker 20 to re-register with it (block 88).

When the device obtains a subsequent registration request (i.e., a re-registration request) from the network speaker 20, the device can update the hardware address of the network speaker 20 and/or update the state of the network speaker 20 to active, if needed (block 82). In some embodiments, as described above, the device can also generate a new password (block 84). The device can then send a subsequent registration response (i.e., a re-registration response) to the network speaker 20 that includes the hardware address of the network speaker 20, a time, and/or the new password or a previously-sent password (block 86).

In some embodiments, if the device does not obtain a re-registration request from the network speaker 20 for a predetermined amount of time (block 90), the device can mark or note that the network speaker 20 is inactive and, therefore, is no longer available to obtain service requests (block 92). In some embodiments, the predetermined amount of time can be equal to the value of a "time" attribute include in a configuration file for the device, twice the value of the "time" attribute, or random time amount.

Marking the network speaker 20 as inactive can cause the device not to send service requests to the network speaker 20. After marking the network speaker 20 as inactive, the device can continue to wait for another registration request that would reactivate the network speaker 20 (block 88).

Figure 7:
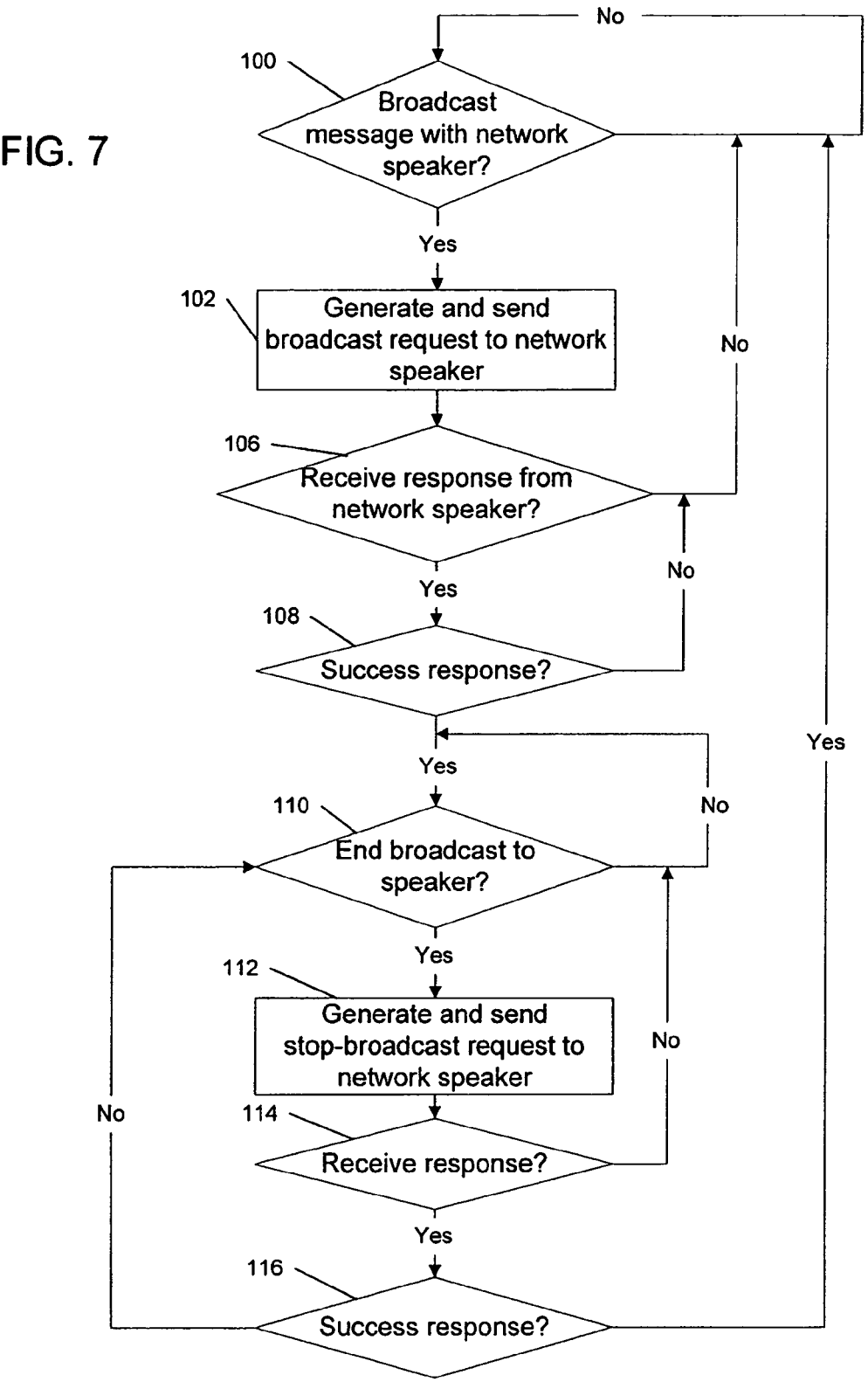
FIG. 7 is a flow chart displaying a process of requesting a broadcast of a message on the speaker illustrated in FIGS. 1 and 2.

FIG. 7 is a flow chart illustrating a process of sending a service request that includes a broadcast request to the network speaker 20. When a device, such as the telephone unit 18, the workstation 12, and/or the audio-capturing device 32, wants the network speaker 20 to broadcast a message (block 100), the device generates and sends a broadcast request (block 102). In some embodiments, a user using the device can initiate a broadcast request in a variety of ways including, but not limited to, selecting the network speaker 20 from a directory listing displayed on the telephone unit 18, typing a HTTP string into a browser address field, or using a specifically designed application installed on the device, such as a client application of the network speaker 20 executed with the workstation 12, that provides a graphical user interface for initiating broadcast requests.

In some embodiments, a broadcast request can include an HTTP GET request with the following exemplary structure: http://1.2.3.4:8088/broadcast?start&stream=239.0.1.2& port=20480&vol=10&password=ja sj3u2

A first portion of a broadcast request (i.e., 1.2.3.4:8088) can include speaker identification, such as the address of the network speaker 20, such as the network address and/or the hardware address. In some embodiments, speaker identification can also include a port of the network speaker 20.

A second portion of a broadcast request (i.e., broadcast?start&stream=239.0.1.2&port=20480) can include source identification, such as an address (e.g., 239.0.1.2) and a port (e.g., 20480) of a source of a message to be broadcast. In some embodiments, the address can be a multicast address that refers to a group of devices, including the network speaker 20. A multicast address is a group address that is not assigned to any particular device on the network. Devices that are interested in receiving data sent to the multicast address can register with a router or similar device in order to indicate that they should obtain data addressed to the multicast address. A port included in a second portion of a broadcast request can specify an endpoint of a logical connection of a source (i.e., a device) that the message is being transmitted over.

A second portion of a broadcast request can also include a request identifier (i.e., broadcast?start) that specifies the type of service being requested, which, in the above example specifies that the start of a broadcast message is being requested.

A third portion of a broadcast request can optionally include a volume level (i.e., vol=10) that specifies a volume level that the network speaker 20 should use to broadcast the requested message. In some embodiments, possible volume levels can range from 0 to 13. A volume level of 0 can indicate no sound or silence. A volume level of 10 can indicate a maximum volume supported by the network speaker 20. In some embodiments, the volume levels 11-13 can represent alterations of audio compression formats, such as mu-law decoding tables, that can be used to artificially boost a volume level.

A fourth portion of a broadcast request (i.e., password=jasj3u2) can include the password the device most recently provided the network speaker 20 during a registration cycle.

In some embodiments, a broadcast request can include additional, optional attributes, such as a "shortText" attribute and/or a "longTextKey" attribute. The "shortText" attribute can specify a string to be displayed as a short text message by the network speaker 20. In some embodiments, the string can include a URL-encoded string. The "longTextKey" attribute can specify a key to be used to obtain a long version of the short text message. In some embodiments, the "longText-Key" attribute can be used when the network speaker 20 is combined with a workstation. A broadcast request with the optional "shortText" attribute and the optional "longText-Key" attribute can have the following exemplary structure: http://1.2.3.4/broadcast?start&stream=239.0.1.2& port=20480&vol=10&password=jasj3u2 &shortText=This+ is +a+short+message . . . &longTextKey=123

The device can send the broadcast request to the network speaker 20 (block 102). In some embodiments, the device can contact a web server running at a predetermined port (i.e., 80 or as specified in the registration request) of the network speaker 20 with the broadcast request. After sending the broadcast request to the network speaker 20, the device can wait to obtain a broadcast response from the network speaker 20 (block 106). If the device does not obtain a broadcast response from the network speaker 20, the device can generate and send another broadcast request (block 102). The device can also choose not to send another broadcast request and can abort the broadcast request. The device can also continue transmitting a message to one or more devices without broadcasting the message using the network speaker 20.

If the device obtains a broadcast response from the network speaker 20, the device determines whether the broadcast response includes a success response (block 108). A broadcast response including a success response can indicate that the broadcast request was granted and that the network speaker 20 is ready to broadcast a message and/or is currently broadcasting a message transmitted from the address and port specified in the broadcast request. A broadcast response including a success response can include the address and the port in order to verify the source of the broadcast message. In some embodiments, a broadcast response including a success response can include an XML-formatted document with the following exemplary structure <SpeakerResponse>
  <Started stream="239.0.1.2" port="20480" vol="10"/>
</SpeakerResponse>

Alternatively, if an error occurred and the broadcast request was not granted, a broadcast response from the network speaker 20 can include an error response. In some embodiments, a broadcast response including an error response can include an error code and/or an error description. The error code and/or the error description can indicate a type of error that occurred, such as an invalid address error, an unrecognizable request error, etc. A user can use the error code and/or the error description to determine how to proceed. For example, if an invalid password error occurred, the device can wait for another registration cycle, can establish a new password with the network speaker 20, and can generate another broadcast request with the new password. In some embodiments, a broadcast response including an error response can include an XML-formatted document with the following exemplary structure:

<SpeakerResponse>
  <Error url="%2Fbroadcast %3Fstart %26&stream=%3D j239.0.1.2%26port=%3D20480%26passwor d=%3Djasj3u" code="17" description="Password Incorrect"/>
</SpeakerResponse>

As shown above, in some embodiments, the "url" attribute can be URL-encoded (i.e., include special characters that are escaped as hexadecimal values) in order to avoid producing an invalid XML-formatted document.

In some embodiments, once the network speaker 20 is broadcasting a message, it is the responsibility of a device other than the network speaker 20 to determine when to stop broadcasting the message (block 110). For example, a device can be responsible for each broadcast it requests and can stop a particular broadcast by sending a stop-broadcast request to the network speaker 20. In other embodiments, the network speaker 20 can be responsible for determining when to stop a broadcast. For example, the network speaker 20 can use stop parameters included in message stream and/or the broadcast request in order to determine when to stop a broadcast. The network speaker 20 can also use an internal timer to set a message broadcast time. The message broadcast time can be a preprogrammed default time, a time specified by a device requesting the broadcast, and/or a time specified by the device transmitting the message.

To stop a requested service, such as a broadcast, a device can generate a stop service request. As shown in FIG. 7, to stop a broadcast a device can generate and send a stop-broadcast request to the network speaker 20 (block 112). A stop-broadcast request can include an HTTP GET request with the following exemplary structure:
http://1.2.3.4:8088/broadcast?stop&stream=239.0.1.2& port=20480&password=jasj3u2

As illustrated above, a stop-broadcast request can have a similar structure as a broadcast request except that the request identifier can indicate that the device is requesting the stopping of a message broadcast rather than the starting of a message broadcast.

After sending a stop-broadcast request to the network speaker 20, a device can wait for a stop-broadcast response from the network speaker 20 (block 114). Upon receiving a stop-broadcast response from the network speaker 20, the device can determine whether the stop-broadcast response includes a success response (block 116). A stop-broadcast response including a success response can indicate that the network speaker 20 successfully ceased broadcasting the audio stream and left the multicast group. In some embodiments, a stop-broadcast response including a success response can include an XML-formatted document with the exemplary structure:

<SpeakerResponse>
<Stopped stream="239.0.1.2" port="20480"/>
</SpeakerResponse>

If the device obtains a stop-broadcast response including a success response, the device knows that the network speaker 20 has successfully ceased broadcasting the message and the device can request another broadcast with the network speaker 20 (block 100).

If, however, the network speaker 20 is unable to successfully stop broadcasting a message indicated in a stop-broadcast request, the network speaker 20 can send a stop-broadcast response including an error response to the requesting device. Upon receiving the broadcast response including the error response, the device can determine whether to retry ending the broadcast (block 110). If the device determines to retry ending the broadcast, the device can re-generate and/or re-send another stop-broadcast request (block 112). In some embodiments, if the device is consistently unable to stop the broadcast to the network speaker 20, the device can send an emergency-stop request to the network speaker 20. The emergency-stop request can place in the network speaker 20 into an error condition where the network speaker 20 cannot broadcast messages.

Figure 8:
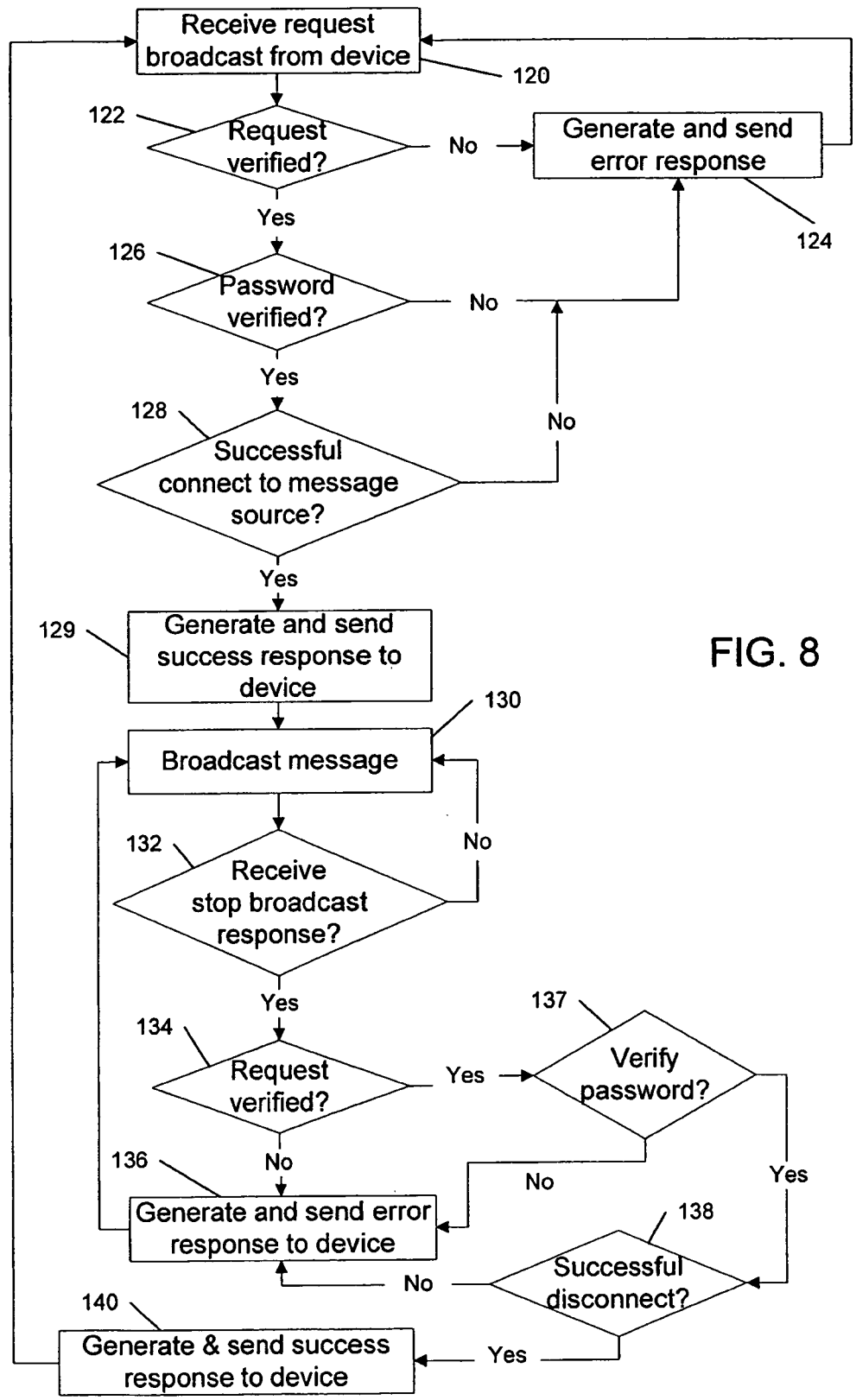
FIG. 8 is a flow chart displaying a process of broadcasting a message on the speaker illustrated in FIGS. 1 and 2.

FIG. 8 displays a process of broadcasting a message with the network speaker 20. To broadcast a message, the network speaker 20 first obtains a broadcast request (block 120). The network speaker 20 then determines whether the broadcast request is a valid request (block 122). If the request is not valid, for example, if the network speaker 20 cannot parse or understand the request, the network speaker 20 generates and sends an error response to the device (block 124) as described above with respect to FIG. 7.

Alternatively, if the broadcast request is valid, the network speaker 20 verifies that the password provided in the request is valid (block 126). In order to verify the password, the network speaker 20 can access the most recently password provided by the device during a registration cycle. In some embodiments, the password provided by the device request the broadcast is stored in the password storage area 58 of the memory module 44 of the network speaker 20. If the password included in the broadcast request matches the previously-provided password, then the password can be considered valid, and the network speaker 20 can proceed with the request broadcast.

If, however, the password included in the broadcast request does not match the password established between the network speaker 20 and the device during the most recent registration cycle (or the broadcast request does not include a password), the network speaker 20 can generate an error response and can send the error response to the device (block 124). The error response can include an error code and/or an error description that indicates that the broadcast request did not include a valid password.

After verifying the password, the network speaker 20 attempts to join the specified multicast and starts playing or broadcasting the specified audio stream (e.g., a G.711 real-time transport protocol ("RTP") stream) (block 128). In some embodiments, to connect to the message source, the network speaker 20 can listen for data packets sent over the network that originate from or are addressed to the address and the port specified in the broadcast request. The network speaker 20 can also connect to the message by creating a virtual link or a dedicated link between itself and the device transmitting the message. In some embodiments, if the network speaker 20 is unable to connect to the message, for example, if the address and/or the port are invalid, the network speaker 20 can generate a broadcast response including an error response (block 124).

If the network speaker 20 does connect to the message, the network speaker can generate and send a broadcast response including a success response to the device that requested the broadcast (block 129).

After verifying that the request, verifying the password, and connecting to the message being transmitted, the network speaker 20 starts broadcasting the message (block 130). The network speaker 20 can also display a message if the broadcast request included a request for one. While broadcasting, the network speaker 20 can wait to obtain a stop-broadcast request (block 132). As previously indicated, the device requesting the broadcast or another device configured to communicate with the network speaker 20 can also be responsible for stopping the broadcast.

Once the network speaker 20 obtains a stop-broadcast request, the network speaker 20 can verify the stop-broadcast request (block 134). If the request is not verified, for example, if the network speaker 20 cannot parse or understand the stop-broadcast request, the network speaker 20 can generate and send a stop-broadcast response including an error response to the device that sent the stop-broadcast request (block 136). Also, if a stop-broadcast request identifies a message stream that the network speaker 20 is not currently broadcasting, the network speaker 20 can generate a stop-broadcast response including an error response indicating that a specified stream in not active. In some embodiments, a stop-broadcast response including an error response, such as an inactive stream error response, can include an XML-formatted document with the following exemplary structure:
<SpeakerResponse>
  <Error url="%2Fbroadcast %2Fstop %36stream=%3D239.0.1.2%26port=%3D20480%26password=%3Djasj3u"
    code="1" description="Stream not active"/>
</SpeakerResponse>

In some embodiments, if the stop-broadcast is not verified, the network speaker 20 continues to broadcast the message (block 130) since a verified stop-broadcast request was not obtained.

If the stop-broadcast request is verified, the network speaker 20 can verify the password included in the stop-broadcast request (block 137). The network speaker 20 can use the passwords obtained and stored during the registration cycles to determine whether a password specified in a stop-broadcast request is valid. If the password is not valid or the stop-broadcast request does not include a password, the network speaker 20 can generate and send a stop-broadcast response including an error response to the requesting device (block 136) and can continue to broadcast the message (block 130) since a valid stop-broadcast request was not obtained.

If the password is valid, the network speaker 20 can attempt to disconnect from the message source (block 138). Disconnecting from the message source can include stopping the processing of data sent by the device and/or port specified in the request and/or terminating a link previously established with the message source. In some embodiments, if the network speaker 20 cannot successfully disconnect from the message source, the network speaker 20 generates and sends a stop-broadcast response including an error response (block 136), and, since a valid and successfully executed stop-broadcast request was not obtained, the network speaker 20 continues to broadcast the message (block 130).

Once the network speaker 20 successfully disconnects from the message source and ceases to broadcast the message, the network speaker 20 can generate and send a stop-broadcast response including a success response to the device that sent the stop-broadcast request (block 140).

In some embodiments, the network speaker 20 can broadcast multiple streams simultaneously and can mix audio streams. If, however, a number of devices request more message broadcasts than the network speaker 20 can support, the network speaker 20 can generate and send a broadcast response and/or a stop-broadcast response including an error response to one or more devices requesting broadcasts.

Figure 9:
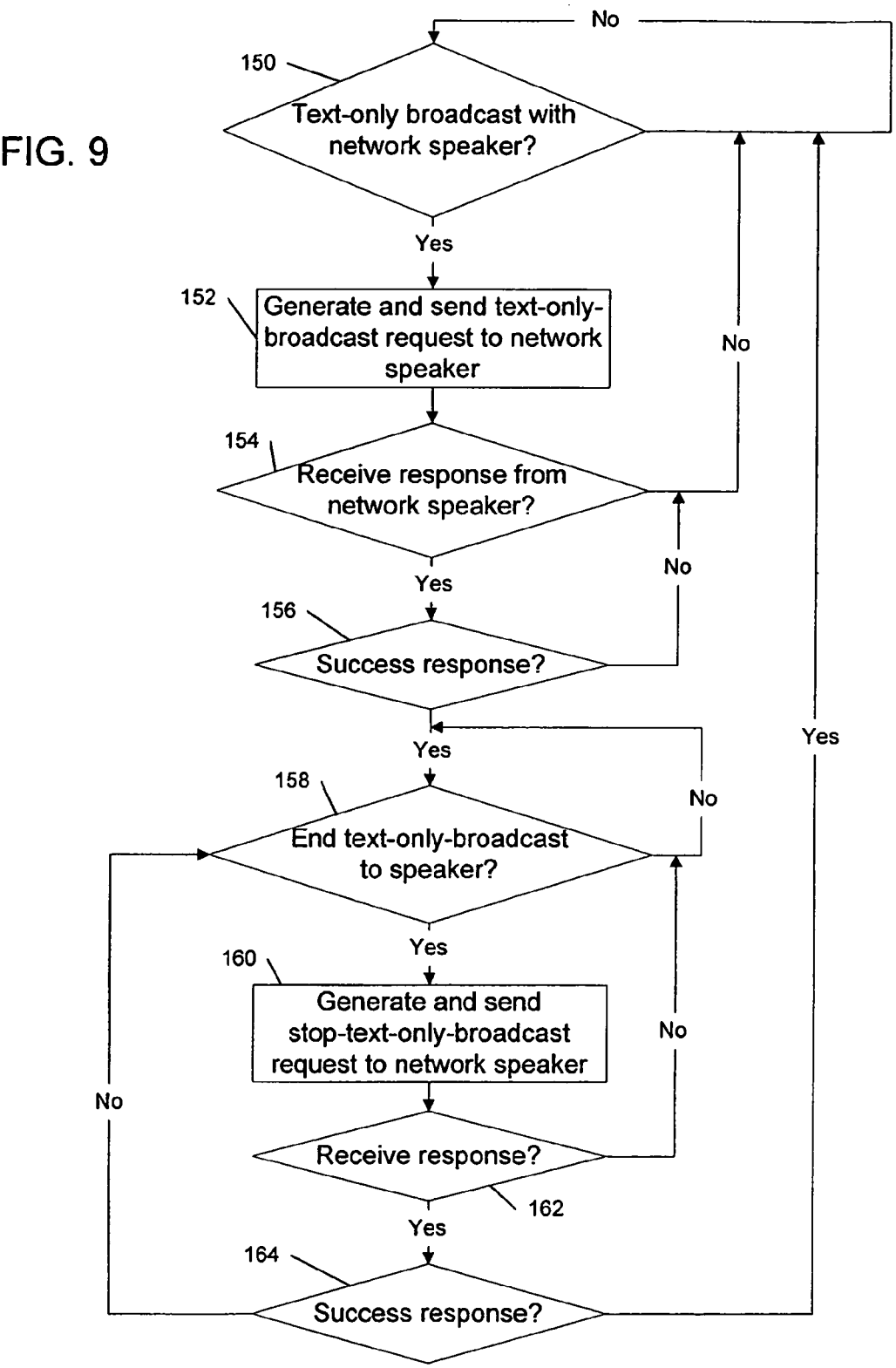
FIG. 9 is a flow chart displaying a process of requesting a display of a message on the speaker illustrated in FIGS. 1 and 2.

In addition to requesting an audio broadcast, devices can also request other services from the network speaker 20, such as the display of a text message. As described above, the network speaker 20 can also include a display that can render text or visual messages in place of or in addition to broadcasting audio messages. As shown in FIG. 9, if a device wants to send a text broadcast to a group of devices that includes the network speaker 20 (block 150), the device can generate and send a service request that includes a text-broadcast request to the network speaker 20 (block 152). In some embodiments, a text-broadcast request can include an HTTP GET request with the following exemplary structure:
http://1.2.3.4:8088/broadcast?display&shortText=URL+ ENCODED+TEXT&longTextKey=12345&password=jasj3u2

A first portion of a text-broadcast request (i.e., http://1.2.3.4:8088) can include speaker identification, such as an address of the network speaker 20 (e.g., a network and/or a hardware address). In some embodiments, the address can also include a port of the network speaker 20.

A second portion of a text-broadcast request (i.e., broadcast?display&shortText=URL+ENCODED+ TEXT&longTextKey=12345) can include a request identifier that specifies that the device is requesting the start of a message display. A text-broadcast request can also include a "shortText" attribute, as described above, that specifies a short text message to be displayed. The short text message specified with the "shortText" attribute can include a URL-encoded string. The second portion can also include a "longTextKey" attribute that specifies a key for retrieving a long version of the short text message specified by the "shortText" attribute.

An optional third portion of a text-broadcast request (i.e., password=jasj3u2) can include the password the device most recently provided the network speaker 20 during a registration cycle.

In some embodiments, the "shortText" attribute can be required for text broadcasts, and the "longTextkey" attribute can be optional.

After generating and sending the text-broadcast request, the device can wait to obtain a text-broadcast response from the network speaker 20 (block 154). If the device obtains a text-broadcast response from the network speaker 20, the device can determine whether the text-broadcast response includes a success response (block 156). A text-broadcast response including a success response can indicate that the network speaker 20 verified the password included in the text-broadcast request and successfully displayed the requested message. In some embodiments, a text-broadcast response including a success response can include an XML-formatted document with the following exemplary structure:
<IPSpeaker response>
   <Text display="Success" shortText="URL ENCODED TEXT" longTextKey="12345"/>
</IPSpeaker response>

As shown above, the text-broadcast response including the success response can include a "Text display" attribute that specifies a successful display and the "shortText" value and/or the "longTextKey" value specified in the text-broadcast request.

If, on the other hand, the device obtains a text-broadcast response that includes an error response (or does not obtain a text-broadcast response from the network speaker 20), the device can decide if it wants to re-request display of the text message (block 150). And, if so, the device can generate and send another text-broadcast request to the network speaker 20 (block 152).

If the device obtains a text-broadcast response that includes a success response, the device that requested the broadcast of the message (or another device connected to the network speaker 20) can determine when to terminate the display of the requested message (block 158). Once a device desires to end the message broadcast, the device can generate and send a stop-service request that includes a stop-text-broadcast request to the network speaker 20 (block 160). The stop-text-broadcast request can be similar to the text-broadcast request, as described above, except that the request identifier can indicate that the device is requesting the stopping of a message display rather than the starting of a message display. After sending the stop-text-broadcast request, the device can wait to obtain a stop-text-broadcast response from the network speaker 20 (block 162).

If the device obtains a stop-text-broadcast response, the device can determine whether the stop-text-broadcast response includes a success response (block 164). A stop-text-broadcast response including a success response can indicate that the network speaker 20 verified the password included in the stop-text-broadcast request and successfully ceased displaying the requested message If, on the other hand, the device obtains a stop-text-broadcast response that includes an error response (of the device does not obtain a stop-text-broadcast response from the network speaker 20), the device can decide if it wants to re-request the termination of the display of the text message (block 158). If the device decides to re-request termination of the display of the text message, the device can generate and send another stop-text-broadcast to the network speaker 20 (block 160).

In some embodiments, if the text-broadcast request includes a "longTextKey" attribute, the network speaker 20 can retrieve a corresponding long text message. The network speaker 20 can retrieve a long text message by generating and sending a message request to a device, such as the device requesting the broadcast and/or the message manager, the workstation 12, and/or the server 14. In some embodiments, the message request can include an HTTP GET request with the following exemplary structure:
http://123.45.67.89:8081/Device1/admin?cmd=spkr&getText=12345

A first portion of the message request (i.e., 123.45.67.89:8081) can include device identification of the device from which the network speaker 20 is requesting a long text message from. In some embodiments, the device identification can include the address and port of the device receiving the message request. A second portion of the message request (i.e., Device1/admin?cmd=spkr) can include speaker identification that identifies the network speaker 20 and/or the particular type of request the network speaker 20 is sending. A third portion of the message request (i.e., getText=12345) can include the value of the "longTextKey" attribute specified in the text-broadcast request.

The device receiving the message request can obtain the requested long text message and can send the network speaker 20 a message response that includes a success response. A message response including a success response can include an XML-formatted document with the following exemplary structure:
<LongText>
   <Body>Long text goes here</Body>
<LongText/>

As shown above, the "Body" tag can specify the requested long text message.

If, however, the device receiving the message request cannot obtain the requested long text message (e.g., the requested long text message doesn't exist, the device cannot parse the message request, etc.), the device can send the network speaker 20 a message response that includes an error response. In some embodiments, a message response including an error response can include an XML-formatted document with the following exemplary structure:
<LongText>
   <Error>Error response goes here</Error>
<LongText/>

In some embodiments, the network speaker 20 provides status/troubleshooting information in order to help users debug problems and/or configure the network speaker 20 and/or devices communicating with the network speaker 20. In some embodiments, the network speaker 20 can provide a status page, as illustrated in FIG. 9a, such as a hypertext markup language ("HTML") status page, that a web browser or similar application can display. To access the status page, a user can direct a web browser application at a URL, such as http://1.2.3.4:8088/status (where 1.2.3.4:8088 can be replaced with the IP address and a port of the network speaker 20). The information included on the status page can include: the time at which the device booted; device address(es) that have been tried to locate configuration or configuration data, and which address(es) successfully used to access configuration or configuration information, if any; the name of the configuration or configuration file accessed, and the time at which it was accessed; device address(es), and the frequency with which these are contacted; the status and time of the most recent registration/heartbeat contact with each server; the number of broadcasts which have been requested, and the number which have been performed; the time, address and port of the most recent broadcast performed, and the number of data packets that were obtained as part of that broadcast; if there are broadcasts in progress at the moment, the address, port and start time of each active broadcast should be indicated as well, along with a count of the number of obtained data packets so far; and/or any other status/configuration information that would be useful from a hardware and firmware diagnostic perspective.

In some embodiments, a device can also test the network speaker 20 in order to ensure that the network speaker 20 is functioning properly and/or to ensure that the operating parameters of the network speaker are configured as desired. Testing the network speaker 20 can include broadcasting a test message (e.g., a message in a particular language and/or tone) and/or displaying a text or visual message with the network speaker 20.

Figure 10:
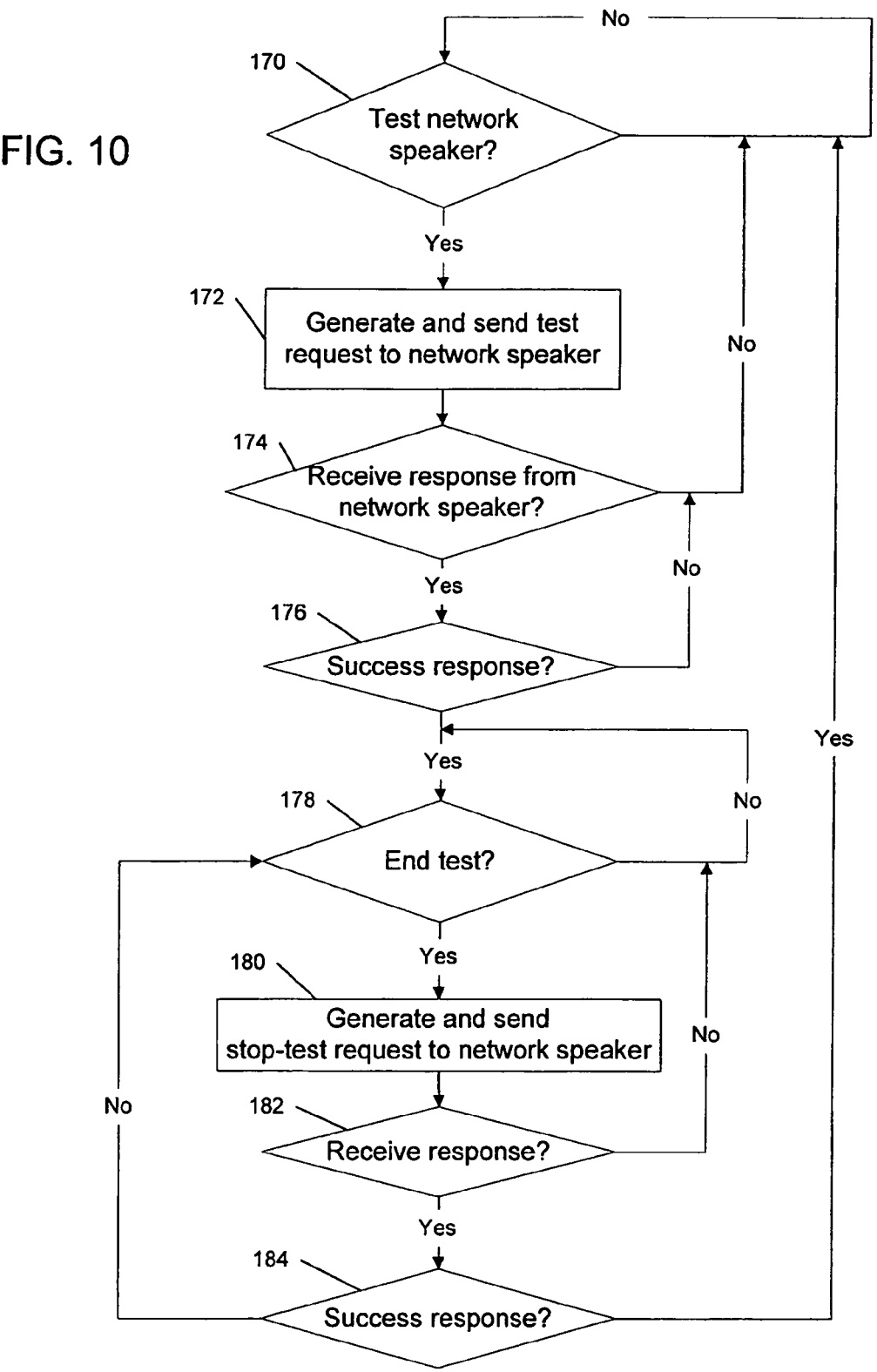
FIG. 10 is a flow chart displaying a process of requesting a test of the speaker illustrated in FIGS. 1 and 2.

As shown in FIG. 10, if a device desires to test the network speaker 20 (block 170), a device can generate and send a service request to the network speaker 20 that includes a test request (block 172). A test request can be initiated in a similar manner as a broadcast request and can include an HTTP GET request with the following structure:
http://1.2.3.4:8088/
broadcast?test&duration=2&vol=10password=jasj3uj2

As shown above, a test request can include the address and port of the network speaker 20 and a request identifier that indicates that the device is requesting a test of the network speaker 20. A test request can also include a "duration" attribute. The "duration" attribute can specify test duration or an amount of time that the text message should be played and/or displayed by the network speaker 20. The test duration can be specified in seconds, minutes, hours, etc. In some embodiments, a test request can be sent without a "duration" attribute value, and the network speaker 20 can use a default time duration, such as five minutes.

A test request can also optionally include a volume level, as described above.

A test request also includes a password. Upon receiving a test request, the network speaker 20 can verify the password. If the password is not valid, the network speaker 20 can disregard a test request and/or can generate and send a test response including an error response to the requesting device. In some embodiments, the network speaker 20 can also verify that the time duration specified in a test request is below an upper limit. The upper limit can prevent excessive test durations. If the specified time duration exceeds the upper limit, the network speaker 20 can disregard a test request and/or can generate and send a test response including an error response to the requesting device. In some embodiments, the network speaker 20 can also adjust the specified test duration so that the duration does not exceed the upper limit. The network speaker 20 can then continue with the test using the adjusted test duration.

After sending the test request to the network speaker 20, the device can wait to obtain a test response from the network speaker 20 (block 174). If the device obtains a test response from the network speaker 20 that includes a success response (block 176), the device can assume that the network speaker 20 verified the password and/or the time duration included in the test request and that the network speaker 20 has begun broadcasting test audio message and/or displaying a test visual message. In some embodiments, the test message can be preprogrammed in the network speaker 20. The test message can also be provided by the device requesting the test.

In some embodiments, the network speaker 20 continues to broadcast the test message and/or tone for the time duration specified in the test request. As described above, the test request can also be sent without specifying a test duration. If test duration is not specified in the test request, the network speaker 20 can either wait for a stop-service request that includes a stop-test request or wait for the expiration of a default time duration.

As shown in FIG. 10, in some embodiments, a device can determine when to stop a test message and/or tone broadcast by the network speaker 20. If the device desires to stop the test broadcast (block 178), the device can generate and send a stop-service request that includes a stop-test request to the network speaker 20 (block 180). In some embodiments, even if test duration was specified in the test request, the device can generate and send a stop-test request to the network speaker 20 in order to stop the test broadcast before the time duration has expired.

After sending the stop-test request (or after sending a test request that includes test duration) the device can wait to obtain a stop-test response from the network speaker 20 (block 182). If the device obtains a stop-test response from the network speaker 20, the device can determine if the response includes a success response (block 184). A stop-test response including a success response can indicate that the network speaker 20 has stopped broadcasting the test tone and/or message. A stop-test response including a success response can also specify an amount of time that the test message and/or tone was successfully broadcast or played. In some embodiments, a stop-test response including a success response can include an XML-formatted document with the following exemplary structure:
<SpeakerResponse>
    <Test duration=2 vol="10"/>
<SpeakerResponse/>

If something prevents the network speaker 20 from playing a test message and/or tone and/or prevents the network speaker 20 from displaying a test message for the specified duration, the network speaker 20 can generate and send a stop-test response to the device that includes an error response to the requesting device. For example, if a test request does not include a valid password, the network speaker 20 can send a stop-test response including an error response that includes an XML-formatted document with the following exemplary structure:
<IPSpeakerResponse>
    <Error url="%2Fbroadcast %3Ftest %26duration=%3D2%26password=%3Djasj3u" code="17" description="Password Incorrect"/>
<IPSpeakerResponse/>

If the device obtains a stop-test response including an error response from the network speaker 20 (or the device does not obtain a stop-test response from the network speaker 20), the device can decide if it wants to request or re-request the termination of the test broadcast (block 178). If the device decides to request or re-request termination of the test broadcast, the device can re-generate and/or re-send a stop-test request to the network speaker 20 (block 180) and can wait for a response (block 182).

As described above, the network speaker 20 can use software/firmware information included in a configuration file to obtain updated software and/or firmware while connected to a network. In some embodiments, a device registered to communicate with the network speaker 20 can also send a service request that includes a reboot request to the network speaker 20 in order to propagate and load new software and/or firmware to a network speaker 20 already connected and configured, as described above with respect to FIG. 5. A reboot request, if verified by the network speaker 20, can cause the network speaker 20 to reboot and perform the configuration process (i.e., obtain an address via DCHP, locate and access a configuration file, etc), as described above.

Figure 11:
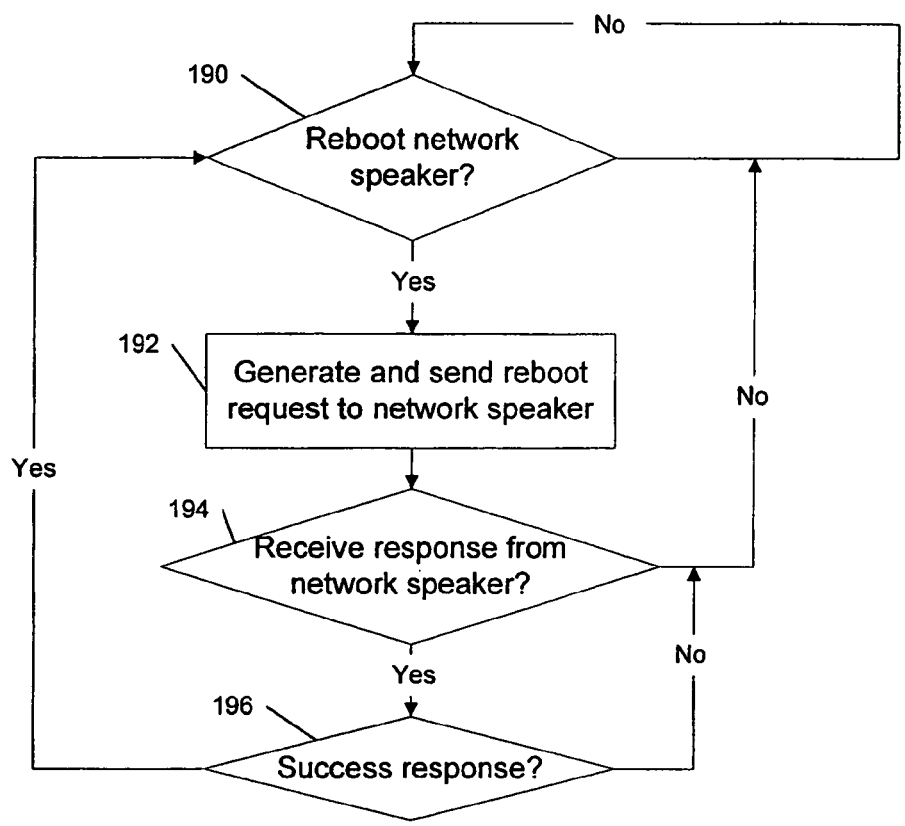
FIG. 11 is a flow chart displaying a process of requesting a reboot of the speaker illustrated in FIGS. 1 and 2.

As shown in FIG. 11, if a device wants to reboot the network speaker 20 (block 190), the device can generate and send a reboot request to the network speaker 20 (block 192). In some embodiments, a reboot request can include an HTTP GET request with the following exemplary structure:
http://1.2.3.4:8088/reboot?password=jasj3u2

A first portion of a reboot request (i.e., 1.2.3.4:8088) can include speaker identification, such as the address and/or port of the network speaker 20. A second portion of a reboot request (i.e., reboot?) can include a request identifier that specifies that the device is requesting a reboot of the network speaker 20, and a third portion of a reboot request (i.e., password=jasj3u2) includes a password previously established during a registration cycle between the network speaker 20 and the device requesting the reboot.

After sending the reboot request to the network speaker 20 the device can wait to obtain a reboot response from the network speaker 20 (block 194). If the device obtains a reboot response from the network speaker 20 that includes a success response (block 196), the device can conclude that the network speaker 20 verified that the password included in the reboot requested matched the password that was specified in the most recent registration response and that the network speaker 20 will reboot. In some embodiments, a reboot response including a success response can include an XML-formatted document with the following exemplary structure:
<IPSpeakerResponse>
  <Rebooting/>
</IPSpeakerResponse>

After sending the reboot response including the success response, the network speaker 20 can reboot and perform the boot-up and configuration process, as described above with respect to FIG. 5.

If something prevents the network speaker 20 from honoring the reboot request, the network speaker 20 can send a reboot response to the device that includes an error response. In some embodiments, a reboot response including an error response includes an XML-formatted document with the following exemplary structure:
<IPSpeakerResponse>
  <Error url="%2Freboot %3Fpassword %3Djasj3u" code="17" description="Password Incorrect"/>
</IPSpeakerResponse>

If the device obtains a reboot response including an error response from the network speaker 20 (or does not obtain a reboot response from the network speaker 20), the device can decide whether to re-request a reboot of the network speaker 20 (block 190). If the device decides to re-request a reboot, the device can re-generate and/or re-send a reboot request to the network speaker 20 (block 192).

As described above, the network speaker 20 can include an audio-capture device, such as a microphone. The audio-capturing device can be included in the network speaker 20 and/or can be externally connected to the network speaker 20 and/or a workstation executing a client application of the network speaker 20.

In some embodiments, audio captured by the network speaker 20 can be captured in various modes. For example, audio can be captured in record mode, in which the recorded audio is stored external to and/or internal to the network speaker 20 for later use. Audio can also be captured live and can be immediately sent to one or more recipient devices, such as the telephone unit 18, and/or broadcast by another network speaker.

Figure 12:
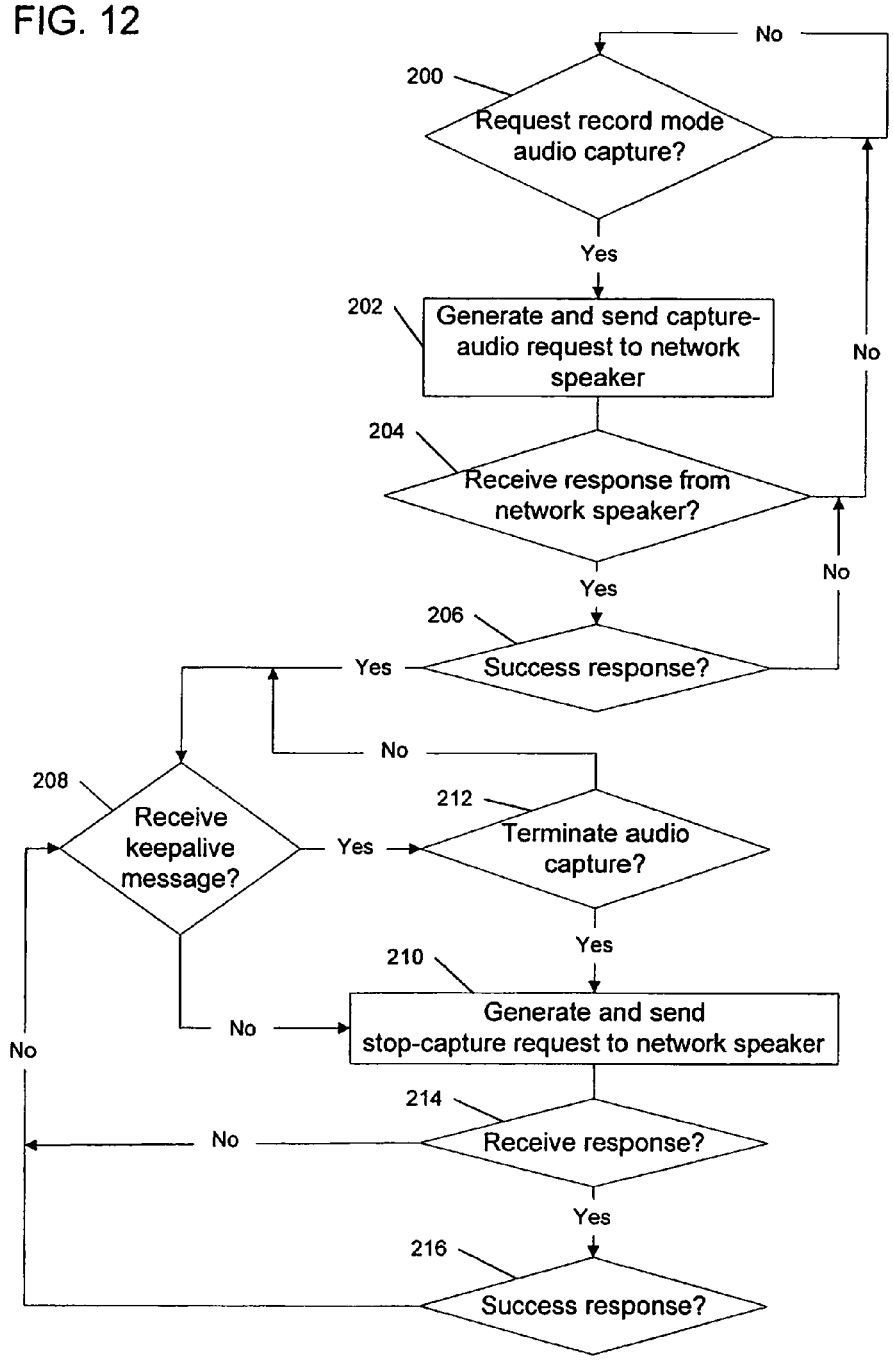
FIG. 12 is a flow chart displaying a process of requesting an audio capture in record mode with the speaker illustrated in FIGS. 1 and 2.

FIG. 12 is a flow chart illustrating a process of request audio capture in record mode. As shown in FIG. 12, if a device wants to request audio capture in record mode (block 200), the device can generate and send a service request that includes a capture-audio request to the network speaker 20 (block 202). In some embodiments, a capture-audio request can include an HTTP GET request with the following exemplary structure:
http://1.2.3.4:8088/capture?record&port=12345&id=987&alert=1&password=jasj3u2

A first portion of a capture-audio request (i.e., 1.2.3.4:8088) can include speaker identification, such as the address and/or port of the network speaker 20. A second portion of a capture-audio request (i.e., capture?record) can include a request identifier, which can indicate that the device is requesting the start of audio capture with the network speaker 20. The request identifier can also indicate a mode for capturing audio (e.g., record, live, or surveillance) and/or whether an audio capture process should be started or stopped.

A third portion of a capture-audio request (i.e., port=12345&id=987) can include destination identification that specifies where the network speaker 20 should transmit the captured audio to. In some embodiments, the destination identification includes a port on the device requesting the audio capture to which the network speaker 20 should transmit the captured audio. A third portion can also include a session identifier. The network speaker 20 can use the session identifier to match a stop-capture request with a corresponding capture-audio request in order to identify a particular audio capture session to terminate. In some embodiments, the network speaker 20 can also use the session identifier to identify a particular captured audio session in a keepalive message, as described below.

Optionally, a fourth portion of a capture-audio request (i.e., alert=1) can include an alert indication that specifies whether the network speaker 20 should play an alert tone and/or message in order to notify anyone within range of the audio-capturing device of the network speaker 20 that audio recording is about to begin. In some embodiments, the network speaker 20 can support a variety of tones and/or messages. For example, the fourth portion of a capture-audio request can include an alert indication with a value of 1 that specifies that the network speaker 20 should play a single brief tone before starting audio recording. Similarly, an alert indication with a value of 2 can specify that the network speaker 20 should play two consecutive brief tones before starting audio recording.

A fifth portion of a capture-audio request (i.e., password=jasj3u2) includes a password. The password can include the password provided from the device requesting the audio capture to the network speaker 20 during the most recent registration cycle.

In some embodiments, a capture-audio request can also include an optional stream identifier. The stream identifier can include an IP address. If a capture-audio request includes a stream identifier, the network speaker 20 can transmit the captured audio stream to the address specified by the stream identifier, rather than automatically transmitting the captured audio stream to the device submitting the capture-audio request. In some embodiments, the network speaker 20 can use the IP address specified by the stream identifier and the port specified in a capture-audio request as the destination for the captured audio. The address specified by the stream identifier can be an IP multicast address or a unicast IP address. In some embodiments, the network speaker 20 can distinguish between the types of IP addresses and can generate an appropriate type of network traffic in order to transmit the captured audio stream packets given the type of destination address. Regardless of the type of destination address for the audio stream packets, the network speaker 20 can assign the audio stream packets to an IP traffic class as specified by the "trafficClass" attribute, which can be included in the software/firmware information included in a configuration file, as described above.

After sending the capture-audio request to the network speaker 20, the device can wait for a capture-audio response from the network speaker 20 (block 204). If the device obtains a capture-audio response from the network speaker 20 that includes a success response (block 206), the device can assume that the network speaker 20 has verified the password included in the capture-audio request and is currently transmitting a stream containing the captured audio to the specified port at the address of the device requesting the audio capture. In some embodiments, the stream of captured audio can include a unicast RTP 8-bit mono uLAW (i.e., G.711) audio stream. It should be understood that other transmission protocols and/or compression formats can be used. The packets of the audio stream can be marked using the IP traffic class specified for the network speaker 20 in a configuration file, as described above with respect to FIG. 5. As noted above, the network speaker 20 can also begin transmitting a unicast or a multicast RTP stream to the IP address specified by the stream identifier at the specified port. In some embodiments, a capture-audio response including a success response can include an XML-formatted document with the following exemplary structure:
<IPSpeakerResponse>
    <Recording port="12345" id="987"/>
</IPSpeakerResponse>

A capture-audio response including a success response can specify the port to which the captured audio is being transmitted and/or the session identifier. In some embodiments, if a capture-audio request included a stream identifier, the corresponding capture-audio response including the success response can also include the destination (i.e., the address) specified by the stream identifier.

If something prevents the network speaker 20 from capturing audio (e.g., the capture-audio request includes an invalid password), the network speaker 20 can send the device requesting the audio capture a capture-audio response that includes an error response. In some embodiments, the capture-audio response including the error response can include an XML-formatted document with the following exemplary structure:
<IPSpeakerResponse>
    <Error url="%2Fcapture %3Frecord %26port %3D12345%26id %3D987%26alert %3D1%26passwo rd %3Djasj3u2"
    code="17" description="Password Incorrect"/>
</IPSpeakerResponse>

While the network speaker 20 is capturing audio, the device requesting the audio capture obtains keepalive message from the network speaker 20 (block 208) that indicate that the audio capture is still taking place with the network speaker 20. As described above, a "Devices" tag included in a configuration file can include a "capture-keepalive-seconds" attribute that can specify a notification frequency for sending messages (i.e., keepalive messages) during an active audio capture process. In some embodiments, a keepalive message can include an HTTP GET request with the following exemplary structure:
http://123.45.67.89:8081/Device1/admin?cmd=spkr&address=0123456789ab&id=987&captureAction=capturing As shown above, a keepalive message can include the address and port of the device that requested audio capture, the hardware (i.e., MAC) address of the network speaker 20, and the session identifier. The keepalive message can also include an action indicator that specifies that the network speaker 20 is continuing to capture the audio as identified by the session identifier.

If the device receiving a keepalive message agrees that the audio capture process identified by the keepalive message is and should be active, the device can respond with a keepalive-agree response. A keepalive-agree response can include an XML-formatted document with the following structure:
<CaptureHeartbeat>
    <Capturing address="0123456789ab" id="987"/>
</CaptureHeartbeat>

Alternatively, if the device does not agree that there is an active capture process as specified in a keepalive message sent from the network speaker 20, the device can respond with a keepalive-disagree response. A keepalive-disagree response can include an XML-formatted document with the following structure:
<CaptureHeartbeat>
    <Error address="0123456789ab" id="987" description="No such capture"/>
</CaptureHeartbeat>

If the network speaker 20 obtains a keepalive-disagree response, the network speaker 20 can go out of capture mode and stop sending audio packets and/or keepalive messages. Similarly, in some embodiments, if the network speaker 20 does not obtain a keepalive-agree response or a keepalive-disagree response from a device after sending one or more consecutive keepalive messages, the network speaker 20 can terminate the audio capture process. The device that requested the audio capture can also conclude that the network speaker 20 has failed if the device does not obtain a keepalive message from the network speaker 20 within a predetermined time interval (block 208), as specified by the "capture-keepalive-seconds" attribute included in the configuration file. In some embodiments, the device can automatically generate and send a stop-capture request (described below) to the network speaker 20 (block 210) if the device has not obtained a keepalive message within the predetermined time interval, in order to ensure that the network speaker 20 has stopped capturing audio.

While the requesting device and the network speaker 20 continue to exchange keepalive messages (indicating that the audio capture is continuing successfully), the device requesting the audio capture can determine when to terminate the audio capture (block 212). To terminate the audio capture the device can generate and send a stop-service request that includes a stop-capture request to the network speaker 20 (block 210). A stop-capture request can include an HTTP GET request with the following exemplary structure:
http://1.2.3.4:8088/capture?stop&id=987&alert=2&password=jasj3u2

A stop-capture request can include the address and port of the network speaker 20, a request identifier that indicates that an audio capture process should be stopped, and the session identifier that was specified by the device in the capture-audio request. A stop-capture request can also include the alert indication that was specified in the capture-audio request and/or a password that was established between the device and the network speaker 20 during the most-recent registration cycle.

After sending the stop-capture request, the device can wait to obtain a stop-capture response from the network speaker 20 (block 214).

In some embodiments, the network speaker 20 verifies the password included in the stop-capture request. The network speaker 20 can also verify that the session identifier included in the stop-capture request matches a currently-active audio capture session. If recording identification and/or the password are verified, the network speaker 20 stops capturing audio and stops transmitting the captured audio stream. The network speaker 20 also stops sending keepalive messages.

If the stop-capture request includes an alert indication, the network speaker 20 can also play an alert tone and/or message in order to notify anyone within range of the audio-capturing device (e.g., a microphone) of the network speaker 20 that recording has terminated. As described above with respect to the capture-audio request, the network speaker 20 can support a variety of tones and/or messages.

In some embodiments, upon receipt and execution of a valid stop-capture request, the network speaker 20 returns a stop-capture response to the device requesting the termination of the audio capture that includes a success response (block 216). A stop-capture response including a success response can include an XML-formatted document with the following exemplary structure:
<IPSpeakerResponse>
   <CaptureStopped id="987"/>
</IPSpeakerResponse>

If something prevents the network speaker 20 from ending the audio capture process specified in the stop-capture request (e.g., the stop-capture request does not include a valid password), the network speaker 20 can send a stop-capture response that includes an error response to the device request the termination of the audio capture. The stop-capture response including the error response can include an XML-formatted document with the following exemplary structure:
<IPSpeakerResponse>
   <Error url="%2Fcapture %3Fstop %26id %3D987%26alert %3D2%26password %3Djasj32"code="17" description="Password Incorrect"/>
</IPSpeakerResponse>

If the device requesting the termination of the audio capture obtains a stop-capture response that includes an error response or does not obtain a stop-capture response from the network speaker 20, the device can determine whether the audio capturing is successfully continuing (i.e., the device can determine whether keepalive messages and responses are being exchanged with the network speaker 20) (block 208) and/or whether to re-request termination of the audio capture (block 212). If the audio capture is continuing and the device desires to re-request termination of the audio capture, the device can re-generate and/or re-send a stop-capture request to the network speaker 20 (block 210).

To capture audio with the network speaker 20 in live mode, a device requesting audio capture can send a service request that includes a capture-audio request to the network speaker 20. In comparison to a capture-audio request in record mode, the capture-audio request in live mode can alert the network speaker 20 that a live audio capture is about to begin, but can cause the network speaker 20 to wait to capture audio until participating playback devices are activated.

Figure 13:
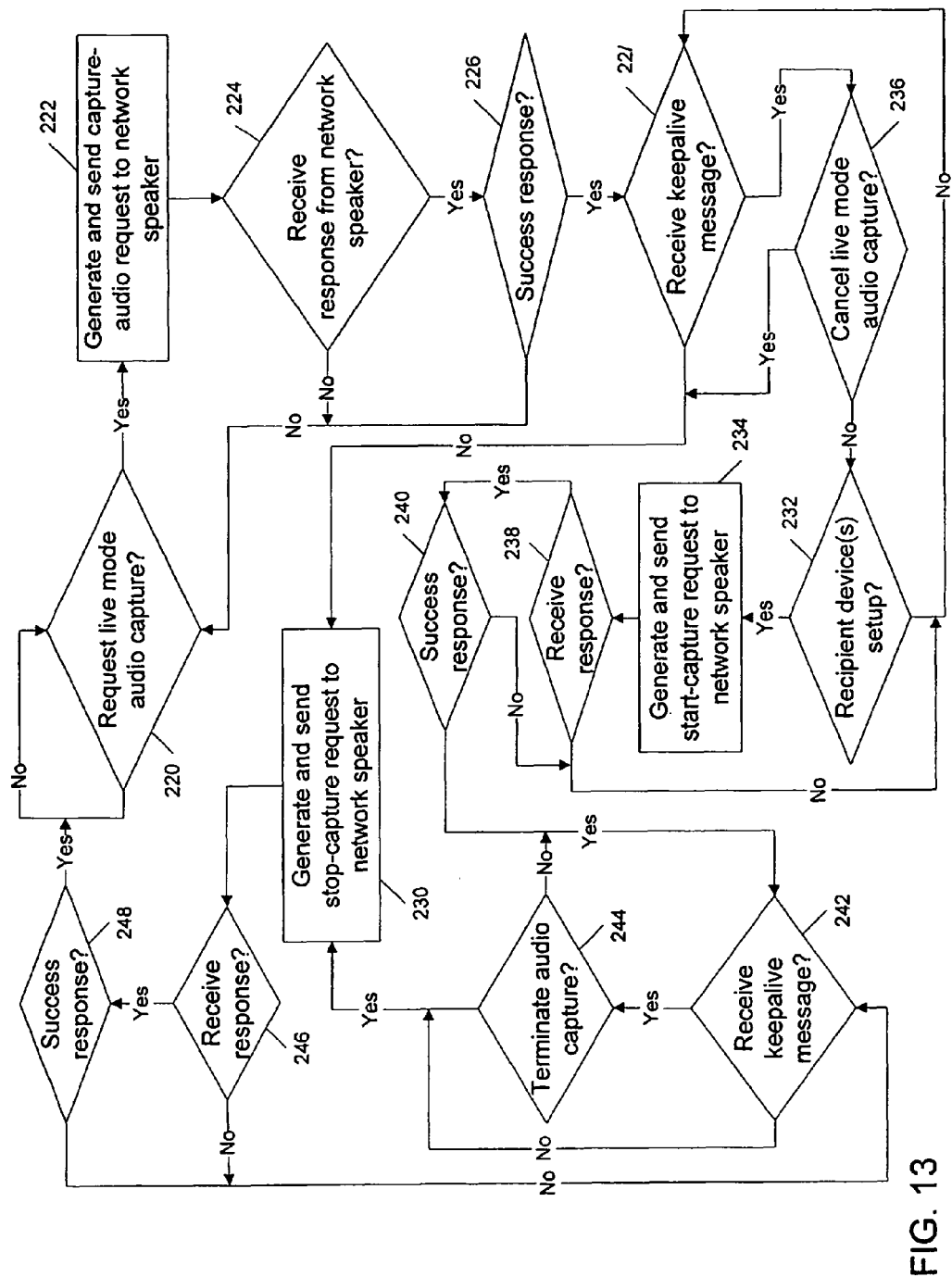
FIG. 13 is a flow chart displaying a process of requesting an audio capture in live mode with the speaker illustrated in FIGS. 1 and 2.
Figure 14:
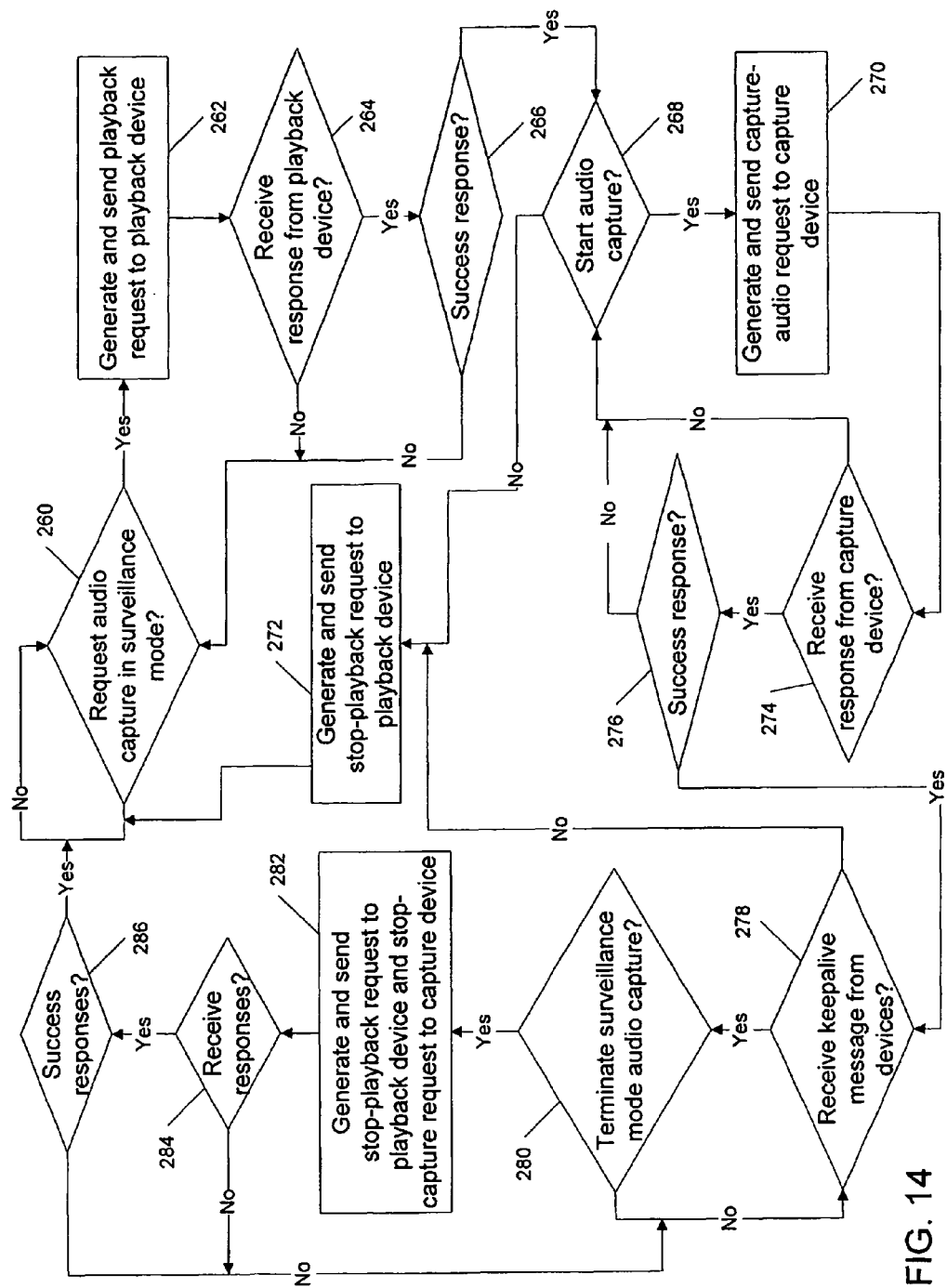
FIG. 14 is a flow chart displaying a process of requesting an audio capture in surveillance mode with the speaker illustrated in FIGS. 1 and 2.

FIG. 13 is a flow chart illustrating a process of request audio capture in live mode. As shown in FIG. 13, if a device wants to request audio capture in live mode (block 220), the device can generate and send a capture-audio request to the network speaker 20 (block 222). In some embodiments, a capture-audio request can include an HTTP GET with the following exemplary structure:

http://1.2.3.4:8088/capture?live&action=setup&stream= 239.0.1.2&port=12345&id=987& alert=3&password=jasj3u2

As shown above, a capture-audio request can include the address and port of the network speaker 20 and a request identifier that, in the above example, specifies that the device is requesting the starting of audio capture in live mode. A capture-audio request can also include an action indicator (i.e., action=setup). The action indicator can specify a "setup" action that indicates that a live audio capture is being setup.

A capture-audio request for live mode capture can also include an address and/or port that specify where captured audio should be transmitted to. As described above, the capture-audio request can optionally include a stream identifier. The stream identifier can specify a unicast address or a multicast address to which captured audio should be transmitted to. In some embodiments, if a capture-audio request does not include a stream identifier, once a live capture and simultaneous broadcast begins, audio packets (e.g., unicast RTP packets) are automatically sent to the address of the device that submitted the capture-audio request. Furthermore, a capture-audio request can include a session identifier. The network speaker 20 can make a note of the session identifier associated with the request in order to verify and/or match a start-capture request and/or a stop-capture request that the network speaker 20 may obtain later. The network speaker 20 can also use the session identifier to identify an audio capturing session identified in a keepalive message.

The network speaker 20 can use the address specified by the stream identifier or the address of the device requesting the live capture to monitor what is happening on a stream. In some embodiments, the network speaker 20 can use the address specified by the stream identifier to distinguish between a unicast IP address and a multicast IP address. If the network speaker 20 detects that the stream identifier specifies a multicast stream for the captured audio, the network speaker 20 can join the stream during the setup phase and can watch for traffic taking place on the stream in order to ensure that it uses a different stream identifier than the alert tone and/or message, which the network speaker 20 can broadcast during the setup phase.

In some embodiments, regardless of whether a unicast IP address or a multicast IP address is used, the audio packets transmitted from the network speaker 20 can be marked using the IP traffic class specified for the network speaker in the configuration file, as described above.

In addition, a capture-audio request for live mode capture can include an alert indication. If a capture-audio request includes an alert indication, the network speaker 20 can play an alert tone and/or message in order to notify anyone within range of the audio-capturing device of the network speaker 20 that recording is about to begin. As previously described, the network speaker 20 can be configured to support various alert tones and/or message. In some embodiments, when in imminent live capture is imminent, the network speaker can continuously play an alert tone and/or message until the live capture is started and/or stopped. For example, an alert indication with a value of "3" can specify that the network speaker 20 should generate a quiet tone in order to indicate a stalling period.

A capture-audio request also includes a password.

After sending the capture-audio request, the device can wait to obtain a capture response from the network speaker 20 (block 224).

Upon receiving the capture-audio request, the network speaker 20 can verify the password included in the request. The network speaker 20 can also play an alert tone and/or message if specified in the capture-audio request. In some embodiments, the network speaker 20 or a client application of the network speaker 20 can indicate that a live broadcast is imminent in other ways, such as displaying a message on a display and/or flashing an indicator. If the network speaker 20 has a rich user interface, the network speaker 20 can also provide a user a mechanism to cancel the imminent live broadcast, as described below.

After the network speaker 20 obtains the capture-audio request for a live capture mode and verifies the request, the device requesting the audio capture can obtain a capture-audio response from the network speaker 20 that includes a success response (block 226). In some embodiments, a capture-audio response including a success response can include an XML-formatted document with the following exemplary structure:

<IPSpeakerResponse>
    <Setup id="987"/>
</IPSpeakerResponse/>

As shown above, a capture-audio response that includes a success response can include a "Setup id" attribute. The "Setup id" attribute can specify a unique setup identifier for the live audio capture session that is setup and waiting to begin. In some embodiments, the network speaker 20 can assign a unique to a pending live audio capture. The "Setup id" can also be set to the session identifier included in the capture-audio request.

After sending the capture-audio response including a success response, the network speaker 20 can wait to obtain a start-capture request that will start the pending capture process. In some embodiments, while waiting for a start-capture request, the network speaker 20 can transmit keepalive messages, as described above, to the device requesting the audio capture (block 228). Keepalive messages can be sent from the network speaker 20 at time intervals as specified in a configuration file as described above. As also described above, the failure of the network speaker 20 to send a keepalive message or the failure of the requesting device to respond to a keepalive message can cause the network speaker 20 and/or the device requesting the audio capture to terminate the pending audio capture (block 230).

If, however, something prevents the network speaker 20 from successfully setting up a pending live audio capture (e.g., the capture-audio request includes an invalid password), the network speaker 20 can send the requesting device a capture-audio response that includes an error response. In some embodiments, a capture-audio response that includes an error response can include an XML-formatted document with the following exemplary structure:

<IPSpeakerResponse>
    <Error
url="%2Fcapture%3flive%26action%3Dsetup%26stream%3D239.0.1.2%26port%3D1234 5%26id%3D987%26alert%3D3%26password%3Djasj3u2"
    code="17" description="Password Incorrect"/>
</IPSpeakerResponse/>

Once the requesting device determines that the recipient device(s) that will obtain the live captured audio are setup and ready (block 232), the device can generate and send a start-capture request to the network speaker 20 (block 234). In some embodiments, if the requesting devices determines that one or more recipient devices are not ready to broadcast live captured audio and/or the requesting devices wants to cancel the pending audio capture (block 236), the requesting device can send the network speaker 20 a stop-service request that includes a stop-capture request (block 230), as described above for capturing audio in record mode. If the network speaker 20 obtains a stop-capture request before a start-capture request, the network speaker 20 can accept the stop-capture and can terminate the pending audio capture and return the network speaker 20 to an idle, non-capturing state.

In some embodiments, a start-capture request can include a HTTP GET request with the following exemplary form:
http://1.2.3.4:8088/capture?live&action=ready&stream= 239.0.1.2&port=12345&id=987& alert=1&password=jasj3u2

A start-capture request can include similar attributes as the capture-audio request for capturing live audio. An action indicator included in a start-capture request, however, can specify a "ready" action that indicates that the recipient devices are ready and a live audio capture and simultaneous broadcast can begin.

A start-capture request can optionally include an alert indication. An alert indication can instruct the network speaker 20 to play an alert tone and/or message in order to notify anyone within range of the audio-capturing device of the network speaker 20 that recording has begun.

After sending the start-capture request to the network speaker 20, the device can wait to obtain a start-capture response from the network speaker 20 (block 238).

Upon receiving the start-capture request, the network speaker 20 can verify the password included in the request. The network speaker 20 can also verify that the session identifier included in the start-capture request matches a session identifier for a pending capture. If the session identifier and the password are verified, the network speaker 20 can begin a live audio capture and can begin sending audio packets to the recipient devices.

Upon receipt and execution of a verified start-capture request, the network speaker 20 can send the requesting device a start-capture response that includes a success response (block 240). A start-capture response including a success response can include an XML-formatted document with the following exemplary structure:

<IPSpeakerResponse>
    <Live id="987"/>
</IPSpeakerResponse>

As shown above, a start-capture response that includes a success response can include a "Live id" attribute. In some embodiments, the "Live id" attribute can be set equal to the session identifier specified in the capture-audio request and/or the start-capture request. The network speaker 20 can also randomly assign a value to the "Live id" attribute.

Once the network speaker 20 is actively capturing audio and transmitting the captured audio packets to the recipient device(s) (where the capture audio is immediately being played and/or broadcast), the network speaker 20 can continue to capture and transmit audio packets until it obtains a stop-service request that includes a stop-capture request, as described above with respect to capturing audio in record mode. While capturing audio, the network speaker 20 can also send keepalive messages to the requesting device in order to inform the device that audio capture is continuing (block 242).

If, however, something prevents the network speaker 20 from entering a live capture state (e.g., the start-capture request does not include a valid password), the network speaker 20 can send the requesting device a start-capture response that includes an error response. In some embodiments, a start-capture response including an error response can include an XML-formatted document with the following exemplary structure:

```
<IPSpeakerResponse>
    <Error
url="%2Fcapture%3Flive%26action%3Dready%26stream
%3D239.0.1.2%26port         %3D123        45%26id
%3D987%26alert %3D1%26password %3Djasj3u2"
        code="17" description="Password Incorrect"/>
</IPSpeakerResponse>
```

As described above, once the network speaker 20 is capturing audio, the device that requested the audio capture (or another device connected to the network speaker 20) can determine when to terminate the audio capture (block 244). To terminate the audio capture, a device can generate and send a stop-service request that includes a capture request to the network speaker 20 (block 230) and can wait to obtain a stop-capture response (block 246). If the device obtains a stop-capture response that includes a success response (block 248), the network speaker 20 has successfully terminated the audio capture being performed by the network speaker 20, and the device can request subsequent audio captures, as needed (block 220).

Alternatively, if the device obtains a stop-capture response that includes an error response (or the device does not obtain a stop-capture response from the network speaker 20), the device can determine whether audio capturing is continuing (i.e., the device can determine whether keepalive messages and responses are being exchanged with the network speaker 20) (block 242) and/or whether to re-request termination of the audio capture (block 244). If the audio capture is continuing and the device desires to re-request termination of the audio capture, the device can re-generate and/or re-send a stop-capture request to the network speaker 20 (block 230).

In some embodiments, if the network speaker 20 (or a client application of the network speaker 20) provides a rich user interface, a user can manually and directly initiate audio capture using the network speaker 20 by using a protocol similar to the protocol described above for an external device (i.e., separate from the network speaker 20) to request audio capture using the network speaker 20. As previously described, the network speaker 20 can use the "ui" attribute to specify whether or not it provides a rich user interface, and, therefore, whether the network speaker 20 provides particular functionality, such as recording capabilities and/or intercom capabilities.

In some embodiments, to start capturing audio in a record with the network speaker 20, a user can generate and send a service request that includes a capture-audio request to an intermediary device, such as the server 14 and/or the message manager 16, from the network speaker 20 or a client application of the network speaker 20. Capture-audio requests generated with the rich user interface can be similar to the capture-audio requests generated by an external device (i.e., separate from the network speaker 20). For example, capture-audio requests generated with the rich user interface can include an HTTP GET request with the following exemplary structure:
http://123.45.67.89:8081/Device1/
admin?cmd=spkr&address=0123456789ab&id=987&ca
ptureAction=start In comparison to capture-audio requests generated by an external device, a capture-audio request with a rich user interface of the network speaker 20, as shown above, can include a unique action indicator (labeled "captureAction" in the above and following examples). In some embodiments, a capture-audio request generated with a rich user interface includes an action indicator with a unique label in order to identify capture-audio requests and related communication generated from a user interface of the network speaker 20 (e.g., a client application of the network speaker 20) and audio capture requests and related communication obtained from a device external to the network speaker 20.

After receiving and verifying a capture-audio request generated with a user interface of the network speaker 20, the intermediary device can start capturing audio with the network speaker 20, as described above, by issuing a capture-audio request to the network speaker 20.

Once the network speaker 20 is recording audio, a user can use the network speaker 20 or a client application of the network speaker 20 to issue a cancel-capture request. A cancel-capture request can include an HTTP GET request addressed to the URL of the intermediary device that initiated the capture session. A cancel-capture request can also identify the MAC address of the network speaker 20 or a client application of the network speaker 20 and a session identifier of the active audio capture. In addition, a cancel-capture request can also include an action indicator set to "cancel" as shown below:
http://123.45.67.89:8081/Device1/
admin?cmd=spkr&address=0123456789ab&id=987&ca
ptureAction=cancel The intermediary device can parse and verify the cancel-capture request and can respond to the cancel-capture request with a cancel-capture response that includes a success response. A cancel-capture response that includes a success response can include an XML-formatted document with the following exemplary structure:
```
<CaptureCommand>
    <Cancel address="0123456789ab" id="987"/>
</CaptureCommand>
```

The intermediary device can then terminate audio capture with the network speaker by sending a stop-capture request to the network speaker 20, as described above. The intermediary device can also discard any captured audio. In some embodiments, although a cancel-capture request originated at the network speaker 20 or a client application of the network speaker 20, the network speaker can continue to send audio packets and keepalive messages until it obtains a stop-capture request from the intermediary device. Alternatively, in some embodiments, the network speaker 20 can automatically terminate audio capture upon the acknowledgement of the cancel-capture request from the intermediary device.

If the intermediary device does not accept the cancel-capture request, the intermediary device can return a cancel-capture response including an error response. A cancel-capture response including an error response can include an XML-formatted document with the following exemplary structure:
```
<CaptureCommand>
    <Error       address="0123456789ab"       id="987"
description="No such capture"/>
</CaptureCommand>
```

If the network speaker 20 or a client application of the network speaker 20 obtains the cancel-capture response that includes an error response, the network speaker 20 can continue to capture audio. In some embodiments, the network speaker 20 or the client application of the network speaker 20 reports the reception of the error to a user and/or logs the error, if applicable.

Similarly, when a user indicates they are done capturing audio and wish to save the captured audio, the user issues a capture-done request. A capture-done request can include an HTTP GET request addressed to the URL of the intermediary device that initiated the audio capturing with the network speaker 20. A capture-done request can identify the MAC address of the network speaker 20 or a client application of the network speaker 20 and a session identifier of the active audio capture. A capture-done request can also include an action indicator set to "done" as shown below:
http://123.45.67.89:8081/Device1/ admin?cmd=spkr&address=0123456789ab&id=987&captureAction=done Upon receiving and verifying the capture-done request, the intermediary device responds with a capture-done response that includes a success response. A capture-done response including a success response can include an XML-formatted document with the following exemplary structure:
<CaptureCommand>
    <Done address="0123456789ab" id="987"/>
</CaptureCommand>

The intermediary device can then terminate the capture session by sending a stop-service request that includes a stop-capture request to the network speaker 20, as described above. The intermediary device can also save the recorded audio for later use. In some embodiments, although the capture-done requests are initiated with the network speaker 20 or a client application of the network speaker 20, the network speaker 20 continues to send audio packets and/or keepalive messages until it obtains a stop-capture request from the intermediary device. Alternatively, in other embodiments, the network speaker 20 can automatically stop capturing audio packets upon the reception of a capture-done response including a success response from the intermediary device.

If something prevents the intermediary device from accepting the capture-done request, a capture-done-failed response can be sent from the intermediary device. The capture-done-failed response can be similar to the cancel-capture-failed response described above. The network speaker 20 or a client application of the network speaker 20 can also display the error to a user and/or log the reception of the user, as applicable.

In some embodiments, a user can also use a rich user interface of the network speaker 20 to initiate live mode audio capture. In comparison to capturing audio in live mode when request by an external device, as described, above, when the intermediary device signals that a live broadcast is ready to proceed, rather than immediately sending audio packets, the network speaker 20 or a client application of the network speaker 20 updates its user interface to tell the user they may begin the broadcast. At that point, when the user indicates a desire to begin, the network speaker 20 or a client application of the network speaker 20 can start sending audio packets. The network speaker 20 or client application of the network speaker 20 can also issues a capture-started request to the intermediary device. A capture-started request can include an HTTP GET request addressed to the URL of the intermediary device that initially started the live audio capture. A capture-started request can also identify the MAC address of the network speaker 20 or the client application of the network speaker 20 and a session identifier of the active audio capture. A capture-started request can also include an action indicator set to "start":
http://123.45.67.89:8081/Device1/ admin?cmd=spkr&address=0123456789ab&id=987&captureAction=start A capture-started request can inform the intermediary device that audio capture is taking place so that the intermediary device knows when to stop playing an "alerting" tone it may have broadcasting prior to the commencement of the actual live message. A capture-started request can also inform the intermediary device that an audio capture stream is active so that subsequent capture-done requests obtained by the intermediary device are accepted and are not considered to be error requests that request the termination of inactive streams.

The intermediary device can respond to a capture-started request by sending a capture-started response that includes a success response to the network speaker 20 or a client application of the network speaker 20. A capture-started response including a success response can include an XML-formatted document with the following exemplary form:
<CaptureCommand>
    <Start address="0123456789ab" id="987"/>
</CaptureCommand>

If something prevents the intermediary device from accepting the capture-started request, the intermediary device can generate and send a capture-started-failed response. A capture-started-failed response can include a similar structure as a cancel-capture-failed response and/or a capture-done-failed response, as described and shown above. In some embodiments, the network speaker 20 or a client application of the network speaker 20 can display the capture-started-failed response to a user and/or can log the reception of the capture-started failed response, if applicable.

In some embodiments, the network speaker 20 (and other devices configured to communicate with the network speaker 20) can be configured to capture audio in surveillance mode. For example, a device requesting audio capture with the network speaker 20 can activate a listening device (e.g., a microphone) and a playback device (e.g., the network speaker 20 with a rich user interface or the telephone unit) in order to provide audio capture in surveillance mode.

Figure 15:
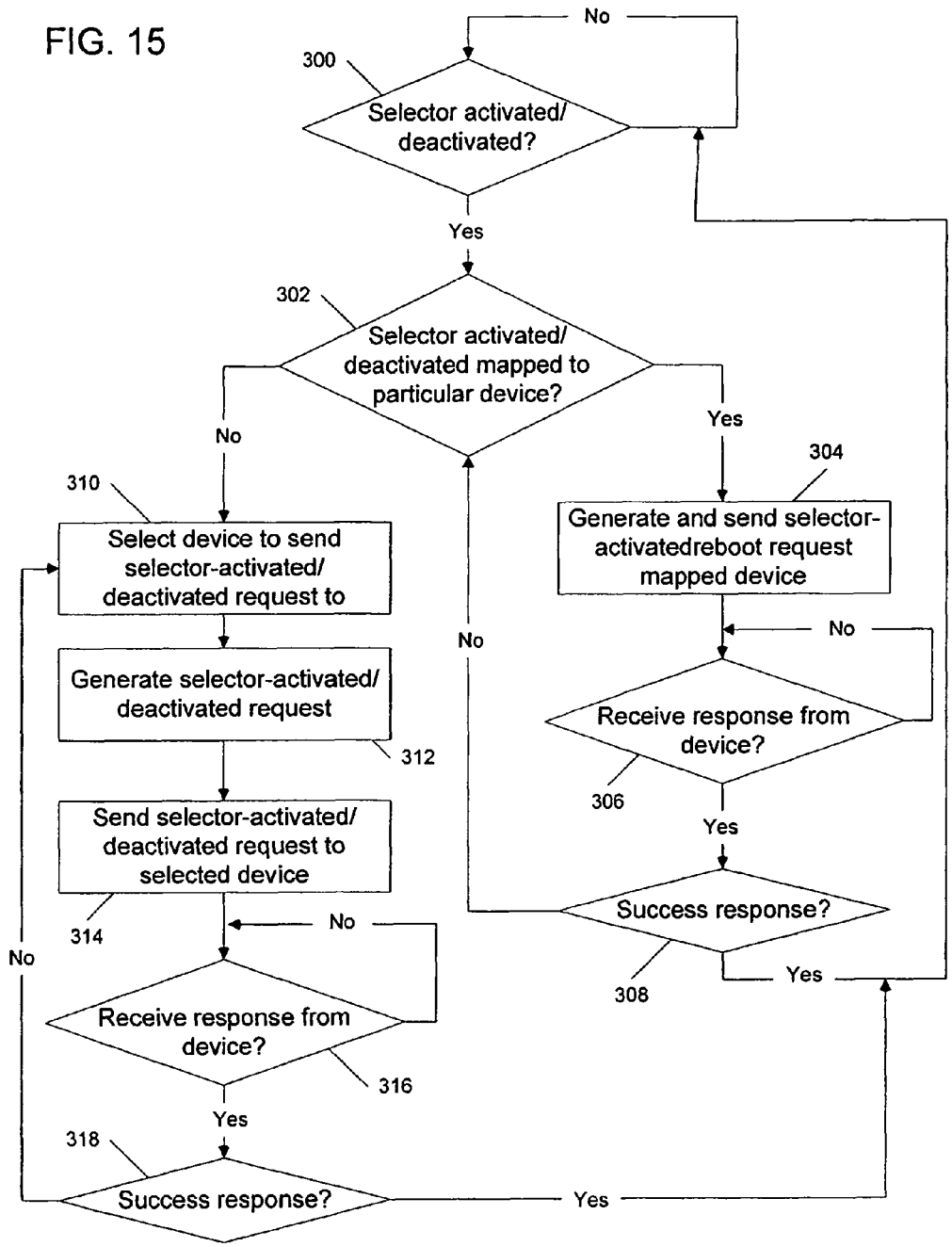
FIG. 15 is a flow chart displaying a process of notifying a device when a selector is activated or deactivated on the speaker illustrated in FIGS. 1 and 2.

FIG. 15 is a flow chart illustrating a process of capturing audio in surveillance mode. As shown in FIG. 15, when a device decides to initiate audio capture in surveillance mode (block 260), a device can generate and send a service request that includes a playback request to a playback device, such as the network speaker 20 (block 262). The playback device can provide an interface for managing a captured audio stream. In some embodiments, a playback request can include an HTTP GET request with the following exemplary structure:
http://1.2.3.4:8088/listen?id=987&source=Speaker+ Name&password=jasj3u2

A playback request can include playback device identification. The playback device identification can include the address and port of the playback device. A playback request can also include a request identifier and a session identifier (i.e., listen?id=987) that indicates that the requesting device is requesting playback and identifies a particular audio capture session that the playback device should "listen" to and monitor. A playback request can also include the name and/or address of the device capturing that is the source of the audio stream identified by the session identifier (i.e., source=Speaker+Name). In some embodiments, a playback request can include an URL encoded representation of the name of the capture device. In addition, a playback request includes a password.

After sending the playback request to the playback device, the requesting device can wait to obtain a playback response from the playback device (block 264).

The playback device receiving the playback request can verify that the password included matches a password previously-established with the requesting device during a registration process. In some embodiments, if the playback device verifies the password, the playback device can display a user interface indicating that surveillance is taking place from the capture location specified in the playback request. The playback device can also provide a user with an option of muting the audio and/or terminating the surveillance mode. The playback device can also make a note of the session identifier included in the playback request in order to verify a stop command it may obtain later to terminate the playback of the audio stream. The playback device can also use the session identifier to transmit keepalive messages to the requesting device, as described below. The playback device can also allocate a port on which to obtain the captured audio and/or configure itself to play audio packets delivered on the port. In addition, the playback device can send a playback response that includes a success response to the requesting device (block 266). In some embodiments, a playback response including a success response can include an XML-formatted document with the following exemplary structure:

<IPSpeakerResponse>
    <Listening port="12345" id="987"/>
</IPSpeakerResponse>

As shown above, a playback response including a success response can include the port that the playback device allocated for the captured audio. The requesting device can pass a port on to the capture device so that the capture device knows how to address transmitted audio packets.

If, however, something prevents the playback device from entering a listening state, the playback device can respond to the requesting device with a playback response that includes an error response. A playback response including an error response can include an XML-formatted document with the following exemplary structure:

<IPSpeakerResponse>
    <Error
url="%2Flisten %3Fid %3D987%26source %3DSpeaker %20Name %26password %3Djasj3u 2"
    code="17" description="Password Incorrect"/>
</IPSpeakerResponse>

In some embodiments, upon receiving a playback response that includes an error response, the requesting device can determine whether to re-request audio capture in surveillance mode (block 260). If the device decides to re-request audio capture, the device can re-generate and/or re-send a playback request to a playback device (block 262).

Assuming that a playback response that includes a success response has been obtained by the requesting device, the requesting device can start capturing an audio stream (block 268). The requesting device can initiate a capture session with a capture device by generating and sending a service request that includes a capture-audio request to a capture device (block 270), as described above with respect to FIGS. 12 and 13. In some embodiments, the requesting device can also decide to cancel the pending audio capture in surveillance mode by sending a stop-service request that includes a stop-playback request to the playback device (described below) (block 272).

A capture-audio request can include a unicast address of the playback device as the stream destination address, and the port returned by the playback device in the playback response that specifies the port to which the audio packets should be delivered. In some embodiments, a capture-audio request can also include a multicast address that includes the playback device and one or more additional destination devices for the captured audio. For example, a captured audio can be transmitted to the playback device for immediate playback and can also be transmitted to a server for storage.

A session identifier can be the same identifier used to set up the playback device and the requesting device can use the MAC addresses of the two devices to differentiate between them when processing keepalive messages. In some embodiments, using MAC addresses to distinguish between a capture device and a playback device can prevent the requesting device from establishing a capture device and a playback device that includes the same physical device.

After sending a capture-audio request to a capture device, the requesting device can wait to obtain a capture-audio response from the capture device (block 274). If the device response a capture-audio response from the capture device that includes a success response (block 276), the capture device verified the capture-audio request and the capture device is capturing audio and transmitting the audio as specified in the capture-audio request.

While the listening process is active, keepalive messages can be sent from the playback device and the capture device to the requesting device (block 278). Keepalive messages sent from the capture device and keepalive response returned from the requesting device can be similar to the keepalive messages and responses described above with respect to capturing audio using the network speaker 20.

Keepalive messages sent from playback device can include an HTTP GET request with the following exemplary structure:
http://123.45.67.89:8081/Device1/ admin?cmd=spkr&address=0123456789ab&id=987&captureAction=playing As shown above, the keepalive messages sent from the playback device can include an action indicator (i.e., captureAction=playing) set to "playing" (compared to being set to "capturing" as included in the keepalive message sent from the capture device). Setting the action indicator to different values can help the requesting device verify that it is receiving proper keepalive messages from the playback device and the capture device.

The requesting device can respond to the keepalive message from the playback device with a keepalive agree response. The keepalive agree response can include an XML-formatted document with the following exemplary structure:

<CaptureHeartbeat>
    <Listening address="0123456789ab" id="987"/>
</CaptureHeartbeat>

If the requesting device, however, does not agree that there is an active surveillance-mode capture being sent to the playback device as specified in a keepalive message from the playback device, the requesting device can respond with a keepalive disagree response. The keepalive-disagree response can include an XML-formatted document with the following exemplary structure:

<CaptureHeartbeat>
    <Error address="0123456789ab" id="987" description="No such listen"/>
</CaptureHeartbeat>

If the playback device obtains a keepalive disagree response, the playback device can go out of listen mode, can close its listening port, can stop playing the captured audio, can remove and/or modify its user interface (e.g., can display an error response), and/or and cease sending keepalive messages. Similarly, if no response has been obtained from the requesting device after a predetermined amount of time (e.g., after two or more consecutive keepalive messages are sent without receiving reply), the playback device can terminate the captured audio surveillance.

In some embodiments, if the requesting device does not obtain a keepalive message from the playback device and/or the capture device, the requesting device can assume that the playback device and/or the capture device has failed, and the requesting device can terminate the surveillance.

When the requesting device desires to terminate the audio capture in surveillance mode (block 280), the requesting device can stop the capture device from capturing audio and the playback device from monitoring the capture audio using a similar mechanism as described above. As shown in FIG.

14, the requesting device can send the playback device a stop-service request that includes a stop-playback request and can send the capture device a stop-service request that includes a stop-capture request in order to terminate audio capture in surveillance mode (block 282). In some embodiments, a stop-playback request can include an HTTP GET request with the following exemplary structure:
http://1.2.3.4:8088/listen?stop&id=987&password=jasj3u2

Similar to the playback request, the stop-playback request can include the address and port of the playback device and a request identifier and a session identifier (i.e., listen?stop&id987) that specifies an audio capture session that the playback device should stop "listening" to and monitoring. In addition, the playback request includes a password.

After sending the stop-capture request and the stop-playback request, the requesting device can wait to obtain responses from the capture device and the playback device (block 284).

The playback device can verify that the password included in the stop-playback request matches a previously-established password between the playback device and the requesting device. In some embodiments, the playback device can also verify that the session identifier matches a currently-active listening session. If the playback device verifies the password and/or the session identifier, the playback device can stop playing the captured audio, can close its listening port, and/or can remove and/or modify a user interface of the playback device (e.g., display a "Playback has been terminated" message). The playback device can also send a stop-playback response including a success response to the requesting device (block 286). Alternatively, if the playback device does not verify the stop-playback request, the playback device can send the requesting device a stop-playback response that includes an error response. The requesting device can then determine whether the audio capture is active (i.e., whether keepalive messages and response are being exchanged with the playback device) (block 278) and/or whether the requesting device wants to re-request termination of the audio capture in surveillance mode (block 280).

Similarly, the capture device can verify that a password included in the stop-capture request matches a previously-established password between the capture device and the requesting device. The capture device can also verify that a session identifier included in the stop-capture request matches a currently-active capture session. If the capture device verifies the password and/or the session identifier, the capture device can stop capturing an audio stream. The capture device can also send a stop-capture response including a success response to the requesting device (block 286). Alternatively, if the capture device does not verify the stop-capture request, the capture device can send the requesting device a stop-playback response that includes an error response. The requesting device can then determine whether the audio capture is active (i.e., whether keepalive messages and response are being exchanged with the capture device) (block 278) and/or whether the requesting device wants to re-request termination of the audio capture in surveillance mode (block 280).

It should be understood that in some embodiments, a device may request the termination of the playback session with the playback device without simultaneously or immediately thereafter requesting termination of the capture session. In some embodiments, a device may start and stop a playback device during an audio capture in surveillance mode.

In some embodiments, a listening session will be ended by a user at the playback device through the user interface. The playback device can then communicate with the device that initially requested the playback by sending a terminate-playback request to the requesting device. The terminate-playback request can include an HTTP GET request with the following exemplary structure:
http://123.45.67.89:8081/Device1/
admin?cmd=spkr&address=0123456789ab&id=987&captureAction=stopListening As shown above, the terminate-playback request can be similar to the keepalive message except that the action indicator (i.e., captureAction) can be set to "stopListening" rather than "playing."

The requesting device can respond to the terminate-playback request by sending a terminate-playback response that includes a success response to the playback device. The terminate-playback-success response can include an XML-formatted document with the following exemplary structure:
<CaptureCommand>
   <StopListening address="0123456789ab" id="987"/>
</CaptureCommand>

The requesting device can then terminate the surveillance process at both ends, as described above, by sending a stop-playback request to the playback device. In some embodiments, although the terminate-playback request is generated from a user interface of the playback device, the playback device continues to play the captured audio until it obtains a stop-playback request from the requesting device. Alternatively, in other embodiments, the playback device can automatically stop playing the capture audio upon receiving the terminate-playback-success response from the requesting device.

If, however, the requesting device does not accept the terminate-playback request (e.g., the terminate-playback request specifies an inactive listening session), the requesting device can return a terminate-playback-failed response. The terminate-playback-failed response can include an XML-formatted document with the following exemplary structure:
<CaptureCommand>
   <Error address="0123456789ab" id="987" description="No such listen"/>
</CaptureCommand>

The terminate-playback-failed response can include an error description that specifies an error that occurred that cause the requesting device not to honor the request.

In some embodiments, the playback device continues to playback audio upon receiving the terminate-playback-failed response. The playback device can report and/or display the error to a user and/or log the reception of the error, if applicable.

In some embodiments, if the network speaker 20 includes one or more selector, the network speaker 20 can report an additional attribute to a device with which it registers that specifies how many selectors the network speaker 20 includes. For example, during the registration process, the network speaker 20 can include a "buttonCount" attribute in a registration request that specifies a number of selectors that the network speaker 20 includes.

When selectors are activated or deactivated (e.g., pressed or released), the network speaker 20 can sends one or more messages to a device without the network speaker 20 is registered with. However, since the network speaker 20 can be registered with multiple devices, the network speaker 20 can send messages to different devices depending on what selectors are activated or deactivated. In some embodiments, the network speaker 20 can contact devices in the order they are listed in a configuration file accessed by the network speaker 20, as described above, until a device reports successfully receiving the message. In other configurations, a configuration file accessed by the network speaker 20 can include configuration tags that specify one or more devices that the network speaker 20 can contact when a particular selector is activated or deactivated.

For example, a configuration file can include a "ButtonMap" tag, as shown below, that specifies a particular selector of the network speaker 20 and one or more addresses of corresponding devices that the network speaker 20 should report the activation or deactivation of the selector to. The "ButtonMap" tag can also specify a command or request that should be sent to the specified device or devices.

<ButtonMap button="red"
url="http://123.45.67.89:8081/Device1/
admin?cmd=spkr"/>

As shown above, the "button" attribute can include an identifier assigned by the network speaker 20 to each selector. A selector identifier can be used when reporting the activation and/or deactivation of a selector as described below. A selector identifier can include numbers or can be descriptive of the purpose or attributes of the selector. In some embodiments, the only constraint on a selector identifier is that the selector identifier includes a legal HTTP query value, and that each selector included on the network speaker 20 be assigned a unique identifier. In some embodiments, the selector identifier can be used in a software configuration of a device registering with the network speaker 20 in order to assign an appropriate response for a selector.

If a "ButtonMap" tag is specified for a particular selector on the network speaker 20, activating or deactivating the selector can cause the network speaker 20 to attempt to contact the device whose address is specified in the "ButtonMap" tag. In some embodiments, if a "ButtonMap" tag is not specified for a particular selector and/or a successful response is not obtained from the device specified in a "ButtonMap" tag, the network speaker 20 can attempt to contact each registered device until the network speaker 20 obtains a successful.

FIG. 15 is a flow chart illustrating a process or notifying a device that a selector of the network speaker 20 is activated or deactivated. It should be understood that although the following example is describe with respect to notifying a device of the activation of a selector of the network speaker 20, the example can also be applied to notifying a device of the deactivation of a selector of the network speaker 20.

As shown in FIG. 15, in some embodiments, when a selector is activated (block 300), the network speaker 20 can determine whether the activation of the selector is mapped to a particular device by a "ButtonMap" tag (block 302). If the activation of the selector is mapped to a particular device, the network speaker 20 can generate and send a selector-activated request to a mapped device (block 304). A selector-activated request can include an HTTP GET request addressed to the URL of the mapped device with the following exemplary structure:

http://123.45.67.89:8081/Device1/
admin?cmd=spkr&address=0123456789ab&button=left
&buttonAction=press A selector-activated request can identify the MAC address of the network speaker 20 (or a client application of the network speaker 20) and/or the selector identifier of the selector that was activated. A selector-activated request can also include an action indicator (labeled "buttonAction" in the above example) that is set to "press" in order to indicate that the selector has been activated. Similarly, in some embodiments, a selector-deactivated request can also include an action indicator that is set to "release" in order to indicate that the selector has been deactivated.

After sending the selector-activated request to the device specified by a "ButtonMap" tag, the network speaker 20 can wait to obtain a selector-activated response from the device (block 306).

If the network speaker 20 obtains a selector-activated response from the device that include a success response (block 308), then the device that obtained the selector-activated request acknowledged the notification of the activation of the selector. In some embodiments, a success selector-activated-success response can include an XML-formatted document with the following exemplary form:

<ButtonState>
  <Pressed address="0123456789ab" button="left"/>
</ButtonState>

Upon receiving a selector-activated response that includes a success response the network speaker can wait for another selector to be activated or deactivated (block 300).

If the network speaker 20 obtains an error response from the device, the device that obtained the selector-activated request did not acknowledge the notification of the activation of the selector. In some embodiments, a selector-activated response including an error response can include an XML-formatted document with the following exemplary structure:

<ButtonState>
  <Error address="0123456789ab" button="left" description="Not configured"/>
</ButtonState>

As shown above, a selector-activated response including an error response can include an error description that can identify an error that occurred that caused the device not to accept the selector-activated request (e.g., the device is not configured to handle the activation of the specified selector of the network speaker 20).

In some embodiments, upon receiving an error response from the device specified by a "ButtonMap" tag, the network speaker 20 can re-check the device specified in a "ButtonMap" tag and/or may attempt to obtain updated "ButtonMap" tags from a configuration file (block 302).

Alternatively, if the activation of the selector is not mapped to a particular device, the network speaker 20 can select a device that is registered with the network speaker 20 (block 310), can generate a selector-activated request (block 312), and can send the selector-activated request to the selected device (block 314). The network speaker 20 can then wait for a response from the device (block 316).

In some embodiments, if the network speaker 20 obtains a selector-activated response that includes an error response from the device that obtained the selector-activated (or if a communication failure occurs and the network speaker 20 does not obtain a response at all from the device), the network speaker 20 can select another device that it is registered with (block 310), can generate a selector-activated request to the selected device (block 312), and can send the selector-activated request to the device (block 314). The network speaker 20 can then wait for a response from the newly selected device (block 316).

If the network speaker 20 obtains a selector-activated response that includes a success response, the device that obtained the selector-activated request acknowledged the notification of the activation of the selector of the network speaker 20. The network speaker 20 can then wait for another selector to be activated or deactivated.

In some embodiments, if the network speaker 20 sends a selector-activated request to each device that it is registered without receiving a selector-activated response including a success response in return, the network speaker 20 can display and/or log an error. The error can indicates that a device that is configured to acknowledge the activation of the selector is not registered with the network speaker 20. The network speaker 20 can also attempt to obtain updated devices to register with from a configuration file, as described above with respect to FIG. 5.

In some embodiments, the network speaker 20 can include one or more controllable binary and/or analog outputs that can be configured and operated by a device registered with the network speaker. The network speaker 20 can provide a list of its controllable binary and/or analog outputs in a registration request to a device, and the device can use the list to set and/or configure an output of the network speaker 20 as needed. For example, a device could configure one or more outputs of the network speaker 20 to open fire station doors and/or shut off gas valves such that a device could request a broadcast and/or the operation of external components through communicating with the network speaker 20 as described above.

It should be understood that while the network speaker 20 is broadcasting messages, displaying messages, broadcasting a test tone and/or message, capturing audio, and/or notifying one or more devices about the activated or deactivation of a selector, the network speaker 20 can continue to execute registration cycles. The network speaker 20 can perform registration cycles on schedule in order to ensure that a device does not consider the network speaker 20 to be inactive. The network speaker 20 can also continually perform registration cycles in order to register with new devices.

In some embodiments, the network speaker 20 is configured to address race conditions that can occur when a device sends a request (e.g., a broadcast request, a test request, a reboot request, etc.) at the same time that the network speaker 20 is registering with the device. In some situations, the network speaker 20 can be configured to accept both the most-recently-accepted password and the second most-recently-accepted password in order to allow a device to submit a request during a registration cycle when a password can be changed. In other situations, the network speaker 20 can be configured to impose an ordering of actions. For example, devices can be required to complete registration before being able to generate requests. Requests arriving between completed registration cycles can be ignored, discarded, or indicated as error conditions to the device by the network speaker 20.

It should be understood that the protocols and descriptions above can be used to broadcast messages to networked devices other than a speaker, such as a telephone unit 18. For example, an audible message can be broadcast by the network speaker 20 while a corresponding textual message can be broadcast to one or more telephone units 18. As described above for the network speaker 20, the telephone units 18 can register with one or more devices connected on a network and can connect to messages transmitted from the devices.

Various additional features and advantages of the invention are set forth in the following claims.

The invention claimed is:

1. A method of registering a network speaker with an audio-transmission, message manager ("ATMM") device and broadcasting one or more multicast messages from the ATMM device to the network speaker, the ATMM device and the network speaker connected to a client-server network, the method comprising:

generating a first registration request that includes a device identification for the ATMM device within the client-server network and a speaker identification for the network speaker within the client-server network;

sending the first registration request within the client-server network from the network speaker to the ATMM device;

marking the network speaker as active;

processing the first registration request, including processing at least one of a plurality of attributes of the network speaker;

generating a first registration response that includes a first password;

sending the first registration response within the client-server network from the ATMM device to the network speaker;

waiting a first predetermined amount of time;

generating a second registration request that includes the ATMM device identification and the network speaker identification;

sending the second registration request to the ATMM device from the network speaker;

generating a second registration response that includes a second password; and sending the second registration response to the network speaker from the ATMM device;

generating a multicast request that includes the network speaker identification, a subsequent password, and a multicast message;

sending the multicast request to the network speaker from the ATMM device;

verifying, at the network speaker, the subsequent password in the multicast request;

outputting, at the network speaker, as an audible signal, the multicast message from the ATMM device in response to the subsequent password being verified; and performing at the network speaker, at least one of outputting a test tone and/or test message, capturing audio, and sending a notification to the ATMM device about one or more activation or deactivation of selectors of the network speaker.

2. The method of claim 1 wherein the plurality of attributes includes whether the network speaker includes a display.

3. The method of claim 1 wherein the plurality of attributes includes whether the network speaker includes a microphone.

4. The method of claim 1 wherein the plurality of attributes are selected from a group including whether the network speaker includes a display, whether the network speaker includes a microphone, and whether the network speaker includes a user interface, and wherein the first registration request specifies whether the network speaker includes a user interface.

5. The method of claim 1 wherein the first registration response includes a network speaker identification.

6. The method of claim 1 wherein the first password is encrypted.

7. The method of claim 1 wherein the first password includes a use indicator.

8. The method of claim 7 further comprising verifying that a value of the use indicator is greater than any previous value obtained from the ATMM device.

9. The method of claim 1 wherein the first registration response includes a first time value.

10. The method of claim 9 further comprising setting an internal timer of the network speaker based on the first time value.

11. The method of claim 9 further comprising displaying a second time value based on the first time value.

12. The method of claim 1 further comprising marking the network speaker as inactive if the ATMM device does not receive the second registration request within a second predetermined amount of time.

13. The method of claim 12 wherein the second predetermined amount of time is substantially equal to twice the first predetermined amount of time.

14. A method of communicating between a network speaker connected to a client-server network and an audio-transmission, message manager ("ATMM"), the method comprising:

generating a first registration request that includes a device identification for the ATMM device within the client-server network and a speaker identification for the network speaker within the client-server network;

sending the first registration request within the client-server network from the network speaker to the ATMM device;

marking the network speaker as active;

processing the registration request, including processing at least one of a plurality of attributes of the network speaker;

generating a first registration response that includes a first password;

sending the first registration response within the client-server network from the ATMM device to the network speaker;

waiting a first predetermined amount of time;

generating a subsequent registration request that includes the ATMM device identification and the network speaker identification;

sending the subsequent registration request to the ATMM device from the network speaker;

generating a subsequent registration response that includes a subsequent password;

sending the subsequent registration response to the network speaker from the ATMM device generating a service request that includes the network speaker identification, a second subsequent password, an action indicator that specifies a requested service, and at least one of an audio broadcast request, a text broadcast request, a test request, a reboot request, and a capture audio request;

sending the service request within a client-server network from the ATMM device to the network speaker;

verifying the second subsequent password included in the service request; and performing the requested service if the second subsequent password is verified by performing at least one of outputting an audio message, displaying a text message, outputting a test message, displaying a test message, rebooting, and capturing audio data.

15. The method of claim 14 and further comprising generating a success response and sending the success response to the ATMM device if the second subsequent password is verified.

16. The method of claim 14 and further comprising generating an error response and sending the error response to the ATMM device if the second subsequent password is not verified.

17. The method of claim 14 and further comprising:

generating a stop service request that includes speaker identification, a fourth password, and an action indicator that specifies a requested service to be stopped; and sending the stop service request to the network speaker from the ATMM device.

18. The method of claim 17 wherein the stop service request includes at least one of a stop broadcast request, a stop text broadcast request, a stop test request, and a stop capture request.

19. The method of claim 17 and further comprising verifying the fourth password included in the stop service request.

20. The method of claim 19 and further comprising ceasing performing the requested service if the fourth password is verified.

21. The method of claim 20 wherein ceasing performing the request service if the fourth password is verified includes at least one of stop outputting an audio message, stop displaying a text message, stop outputting a test audio message, stop displaying a test text message, and stop capturing audio data.

22. The method of claim 1 wherein the subsequent password is identical to the second password.

* * * * *